US008376463B2

(12) United States Patent
Cooper et al.

(10) Patent No.: US 8,376,463 B2
(45) Date of Patent: Feb. 19, 2013

(54) USER ADJUSTABLE WHEELCHAIR BACKREST MOUNTING HARDWARE

(75) Inventors: Rory Alan Cooper, Gibsonia, PA (US); Jonathan Lee Pearlman, Pittsburgh, PA (US); Todd Hargroder, San Antonio, TX (US); Eun-Kyoung Hong, Pittsburgh, PA (US); Hsin-Yi Llu, Pittsburgh, PA (US); Hongwu Wang, Pittsburgh, PA (US); Benjamin Arthur Salatin, Pittsburgh, PA (US)

(73) Assignee: University of Pittsburgh—of the Commonwealth System of Higher Education, Pittsburgh, PA (US)

( * ) Notice: Subject to any disclaimer, the term of this patent is extended or adjusted under 35 U.S.C. 154(b) by 286 days.

(21) Appl. No.: 12/771,533

(22) Filed: Apr. 30, 2010

(65) Prior Publication Data

US 2010/0276975 A1 Nov. 4, 2010

Related U.S. Application Data

(60) Provisional application No. 61/174,250, filed on Apr. 30, 2009.

(51) Int. Cl.
*B60N 2/02* (2006.01)

(52) U.S. Cl. ........... 297/361.1; 297/354.11; 297/354.12; 297/463.1

(58) Field of Classification Search ............. 297/230.14, 297/284.3, 354.11, 354.12, 361.1, 362, 463.1; 16/354; 403/97, 101, 359.1, 359.6
See application file for complete search history.

(56) References Cited

U.S. PATENT DOCUMENTS

| | | | | |
|---|---|---|---|---|
| 3,958,828 | A * | 5/1976 | Ishida et al. | 297/361.1 |
| 4,504,091 | A * | 3/1985 | Ohshiro | 297/362 |
| 5,039,118 | A * | 8/1991 | Huang | 280/47.371 |
| 5,062,179 | A * | 11/1991 | Huang | 16/436 |
| 5,069,474 | A * | 12/1991 | Tai | 280/658 |
| 5,556,168 | A | 9/1996 | Dinsmoor, III et al. | |
| 5,765,958 | A * | 6/1998 | Lan | 403/97 |
| 5,944,385 | A | 8/1999 | Pearce | |
| 5,971,417 | A | 10/1999 | Swisshelm et al. | |
| 6,286,968 | B1 * | 9/2001 | Sailer et al. | 359/872 |
| 7,445,287 | B2 * | 11/2008 | Chou | 297/284.4 |
| 2003/0077111 | A1 * | 4/2003 | Cheng | 403/101 |
| 2008/0109994 | A1 * | 5/2008 | Liao | 16/319 |
| 2010/0148556 | A1 * | 6/2010 | Chou | 297/354.11 |

OTHER PUBLICATIONS

Boninger, M.L., et al., Postural changes with aging in tetraplegia: effects on life satisfaction and pain. Arch Phys Med Rehabil, 1998. 79(12): p. 1998. 79(12): p. 1577-81.

(Continued)

*Primary Examiner* — Peter Brown
*Assistant Examiner* — Philip Gabler
(74) *Attorney, Agent, or Firm* — David G. Oberdick; Peter J. Borghetti

(57) ABSTRACT

Angle adjustable backrest made of a lightweight, durable, adjustable, backrest for ultralight manual wheelchairs. Lightweight material can include composites for a rigid backrest for promotion of healthier and functional interface. Angle adjustment can be any desired range such as a range from −5 degree to 55 degrees (i.e. 85 degrees to 145 degree with respect to horizontal with the seat). No tools are necessary for any of the angle adjustments. The backrest has a horizontal adjustment (fore-aft) that can be any desired range such as 1 inch. The height selection depends on the length of the wheelchair frame tubes. The present invention improves the ease and simplicity of adjusting the backrest by or for the user, as well as enhances the aesthetic appearance and adds features necessary for achieving commercial readiness. The present invention can be retro fit onto a wide range for ultralight wheelchairs.

15 Claims, 24 Drawing Sheets

OTHER PUBLICATIONS

Curtis, K.A., et al., Shoulder pain in wheelchair users with tetraplegia and paraplegia. Arch Phys Med Rehabil, 1999. 80(4): p. 453-7.
DiGiovine, M.M., et al., User assessment of manual wheelchair ride comfort and ergonomics. Arch Phys Med Rehabil, 2000. 81(4): p. 490-4.
Janssen-Potten, Y.J., et al., Chair configuration and balance control in persons with spinal cord injury. Arch Phys Med Rehabil, 2000. 81(4): p. 401-8.
Hastings, J.D., et al., Wheelchair configuration and postural alignment in persons with spinal cord injury. Arch Phys Med Rehabil, 2003. 84(4): p. 528-34.
Nawoczenski, D.A., et al., Three-dimensional shoulder kinematics during a pressure relief technique and wheelchair transfer. Arch Phys Med Rehabil, 2003. 84(9): p. 1293-300.
May, L.A., et al., Wheelchair back-support options: functional outcomes for persons with recent spinal cord injury. Arch Phys Med Rehabil, 2004. 85(7): p. 1146-50.
Chaves, E.S., et al., Assessing the influence of wheelchair technology on perception of participation in spinal cord injury. Arch Phys Med Rehabil, 2004. 85(11): p. 1854-8.
Alm, M., et al., Clinical evaluation of seating in persons with complete thoracic spinal cord injury. Spinal Cord, 2003. 41(10): p. 563-71.
Hobson, D.A., Comparative effects of posture on pressure and shear at the body-seat interface. Journal of Rehabilitation Research & Development, 1992. 29(4): p. 21-31.
McCasland, L.D., et al., Shoulder pain in the traumatically injured spinal cord patient: evaluation of risk factors and function. JCR, 2006. 12(4): p. 179-86.
Desroches, G., et al., Effect of system tilt and seat-to-backrest angles on load sustained by shoulder during wheelchair propulsion. JRRD, 2006. 43(7): p. 871-82.
DiGiovine, C.P. et al, Analysis of vibration and comparison of four wheelchair cushions during manual wheelchair propulsion. RESNA, 2000. p. 429-31.
Shields, R.K., et al., Effect of seat angle and lumbar support on seated buttock pressure. Physical Therapy, 1988. 68(11): p. 1682-86.
Boninger, M.L. et al., Investigating neck pain in wheelchair users. Am. J. Phys. Med. Rehabil, 2003. 82(3): p. 197-202.
Website, Univ. of Washington, SCI Forum Reports. Back pain, wheelchair seating and posture. http://sci.washington.edu/info/forums/reports/posture.asp., May 13, 2003.

* cited by examiner

USER ADJUSTABLE WHEELCHAIR BACKREST MOUNTING HARDWARE

FIELD OF THE INVENTION

The present invention is related generally to the field of angle adjustable backrests, and in particular to wheelchair angle adjustable backrests.

BACKGROUND OF THE INVENTION

In the United States, about 21.2 million people currently have limitations in basic physical activities, such as walking, climbing stairs, carrying, or lifting. Over 100 million people with physical disabilities use wheelchairs for their primary mobility in the world, and yet less than one percent of these people have access to a wheelchair. The use of wheelchairs has increased for several reasons: birth defects, accidents, debilitating diseases, and advanced age. Based on the report of World Health Organization, more than 29,000 people annually have unexpected injuries. An estimated 250,000 to 400,000 people have spinal cord injuries or spinal dysfunction. Therefore, experts anticipate that the need for wheelchairs worldwide will continue to increase, up to 22 percent over the next 10 years.

While the number of wheelchair usage in increasing, it has created an increased demand for wheelchairs has led to an expanded market that continually offers better wheelchairs and seating systems. Based on innovations in technology, people are living longer, and are participating at higher rates. The demand to maintain an active lifestyle is also presented among people with disabilities. Wheelchair technology is integral to maintaining on active life style for individuals with a disability. Wheelchairs allow people with disabilities to have enhanced function, improved independence, and access to home and community. The lack of wheelchair is the main cause of limited participation to people with spinal cord injuries, so the wheelchairs are most important mobility of them. After their injury, wheelchair users accept their disabilities and consider a wheelchair as an extended body. Wheelchairs are critical components to meet users' expectations, preferences, physical needs, and functional requirements.

Different types of wheelchairs have different comfort and ergonomic ratings, as the different wheelchairs have different qualities. A wheelchair having more adjustability received higher ratings on comfort and ergonomics compared to a wheelchair with minimal adjustability. Since most wheelchair users spend half of the day sitting. Therefore, as the supply of manual wheelchairs increases, the demand of making them safer, more effective, and more readily available is necessary with wheelchair users' needs/adjustability.

Secondary injuries (e.g., repetitive strain injuries, pressure sores and so on) are of particular concern for those who use wheelchairs as their primary means of mobility. Since a wheelchair is an extension of the user's body, even the best fit wheelchair may not prevent the secondary injury. Pressure ulcer is one of the secondary injuries. The pressure sore occurs higher when people stay in a confined chair, have inability to move, have poor nutrition, and have lowered mental awareness. People with disabilities have difficulty changing positions and altered sensation, so they are at risk of pressure sores when they are not provided by adequate pressure-relieving mechanisms. Products and services need to be available to prevent or delay these conditions as they provide demands.

It is a challenge to recommend a particular wheelchair because wheelchair configuration influences wheelchair users' comfort, possibilities of transfer, efficient propulsion and so on. Wheelchairs usually have adjustability with axle position, seat depth, height of the footrests, tilting angle and reclining angle. Among those of adjustability, changing height of the footrests or changing backrest angles is only trial and error to avoid pressure sores as prevention of a secondary condition. According to the study of effect with changing tilt and seat-to-backrest angles by shoulder during wheelchair propulsion, seat angle could be standard for the user comfort and pressure modulation without risk of overuse shoulder injuries for alleviating pressure. As the backrest provides pressure relief, it is an essential part of wheelchair configuration.

Differences in postural alignment and shoulder flexion range are observed between wheelchairs with standard configurations and wheelchairs with posterior seat inclination and a low backrest which was set perpendicular to the floor. The wheelchairs with posterior seat inclination and low backrest set perpendicular to the floor give significantly more active upper extremities' flexion. The backrest does support the lumbar spine for maintenance of anterior pelvic tilting. And, the angle of backrest gives the wheelchair users spaces for posterior tilting.

In addition, the backrest protects and supports the spine which is one of the most important structural parts in the body. Because the weight of the upper body is sustained through the spine to transfer into the limbs, the spine is an imperative structural component. Therefore, the protection or support of the spine is essential. In many cases, wheelchair users have insufficient muscle strength to support and control the spine, so the spine tends to be bent and deformities of the spine are caused by forces of gravity. When the wheelchair backrest does not provide proper postural supports to a wheelchair user, the problems of lordosis, kyphosis, scoliosis or some combinations of these postures may be developed.

Pelvic stability affects shoulder mobility which gives wheelchair users weight-bearing and movement. Wheelchair users have to perform tasks during the day in a seated posture and the seating for each task performance is not same all day long. Therefore, seating should allow for changes of posture.

An adjustable backrest is an important feature in different conditions to provide adequate trunk support. While propelling a wheelchair uphill or downhill on a ramp, the wheelchair user should lean into the ramp to minimize the risks of injury or feelings of instability. The adjustment of backrest angle will help to open the hip angle to make users dress easily in the wheelchairs. Also, people could have their own preference for the postures in daily activities. Based on the increasing number of wheelchair users, providing an adjustable backrest is necessary because of the importance of seating position and appropriate trunk support.

A backrest has different characteristics according to height, shape, stiffness, weight, adjustability and so on. Based on the height of the backrest, wheelchair users have different support and functions. Low backrest provides freedom of movement, but less stable. On the other hand, high backrest provides more support, but limits mobility for propulsion. The rest of characteristics are different from types of backrests. Manual wheelchairs are commonly fitted with one of three types of backrest: sling upholstery backrest, rigid backrest, and custom molded backrest. Most manual wheelchairs come with sling upholstery for the backrest. The sling upholstery backrest is made of fabric or leather. The rigid backrest is one of the most recommended backrest to support user's posture as a combination of a back cushion on a rigid frame. The custom molded backrest is an individualized backrest for a person who has particular deformity. Each has different perspectives which could be advantages or disadvantages.

The sling upholstery backrest has a rectangular shape based of frames of wheelchair s tubes. The materials of sling backrest which are fabric or leather are stretched out wheelchair backrest. Because of features of materials, it has adjustability, contours to the shape of spine, and is lightweight. An advantage of this type of backrest is that it can be used by a wide range of people because it conforms based on the back shape and posture, and thus it is common and useful. The flexibility of this backrest also makes it ideal for folding wheelchair which is easily transportable. A primary drawback to the sling backrest is that it does not provide a stable base of support for the posture.

The rigid backrest has different features contrast to the sling backrest. The rigid frame of backrest has the contour of back, so it looks a trapezoid from seeing upside. Even though there is cushion on the backrest, the frame is firm and has additional weight. Therefore, it is generally not adjustable and is sensitive to the user's body size. However, it provides a solid base of support for appropriate posture, so it is most appropriate for users without a postural deformity.

The individualized contour backrest is shaped individually, but usually looks big and bulky. This type of backrest covers whole spine and fills spaces to support deformity of spine. It is very individual product, so it requires intensive labor. The quality of the custom molded backrest depends on clinicians' skills.

Among the three types of the backrests, the standard sling upholstery for the backrest has been used for most wheelchair manufacturers and wheelchair users. As mentioned earlier, the sling upholstery has a flexibility and adjustability of tension, so wheelchair users can make periodically suitable. However, it provides less postural support. In addition, it would not be enough to support wheelchair users' back while being in dynamic functions such as up and down ramps, various surfaces and over obstacles.

There is a need for a lightweight, sturdy, user-adjustable, easily set-up and ergonomic backrest support for ultralight wheelchairs to satisfy the needs of wheelchair users by maximizing functionality and improving ease of use. An angle adjustable backrest provides necessary postural support and a variety of positions to easy dressing, propulsion, and seated comfort.

SUMMARY OF THE INVENTION

The present invention is a lightweight, durable, adjustable, backrest for ultralight manual wheelchairs. Light weight material can include composites for a rigid backrest for promotion of healthier and functional interface. Angle adjustment can be any desired range such as a range from −5 degree to 55 degrees (i.e. 85 degrees to 145 degree with respect to horizontal with the seat). No tools are necessary for any of the angle adjustments. The backrest has a horizontal adjustment (fore-aft) that can be any desired range such as 1 inch. The height selection depends on the length of the wheelchair frame tubes.

The present invention improves the ease and simplicity of adjusting the backrest by or for the user, as well as enhance the aesthetic appearance and add features necessary for achieving commercial readiness. The present invention can be retro fit onto a wide range for ultralight wheelchairs.

For a better understanding of the present invention, together with other and further objects thereof, reference is made to the accompanying drawings and detailed description.

BRIEF DESCRIPTION OF THE DRAWINGS

The present invention is illustratively shown and described in reference to the accompanying drawings, in which.

DETAILED DESCRIPTION OF THE INVENTION

As used herein in the specification and claims, including as used in the examples and unless otherwise expressly specified, all numbers may be read as if prefaced by the word "about", even if the term does not expressly appear. Also, any numerical range recited herein is intended to include all sub-ranges subsumed therein.

Figure 25:
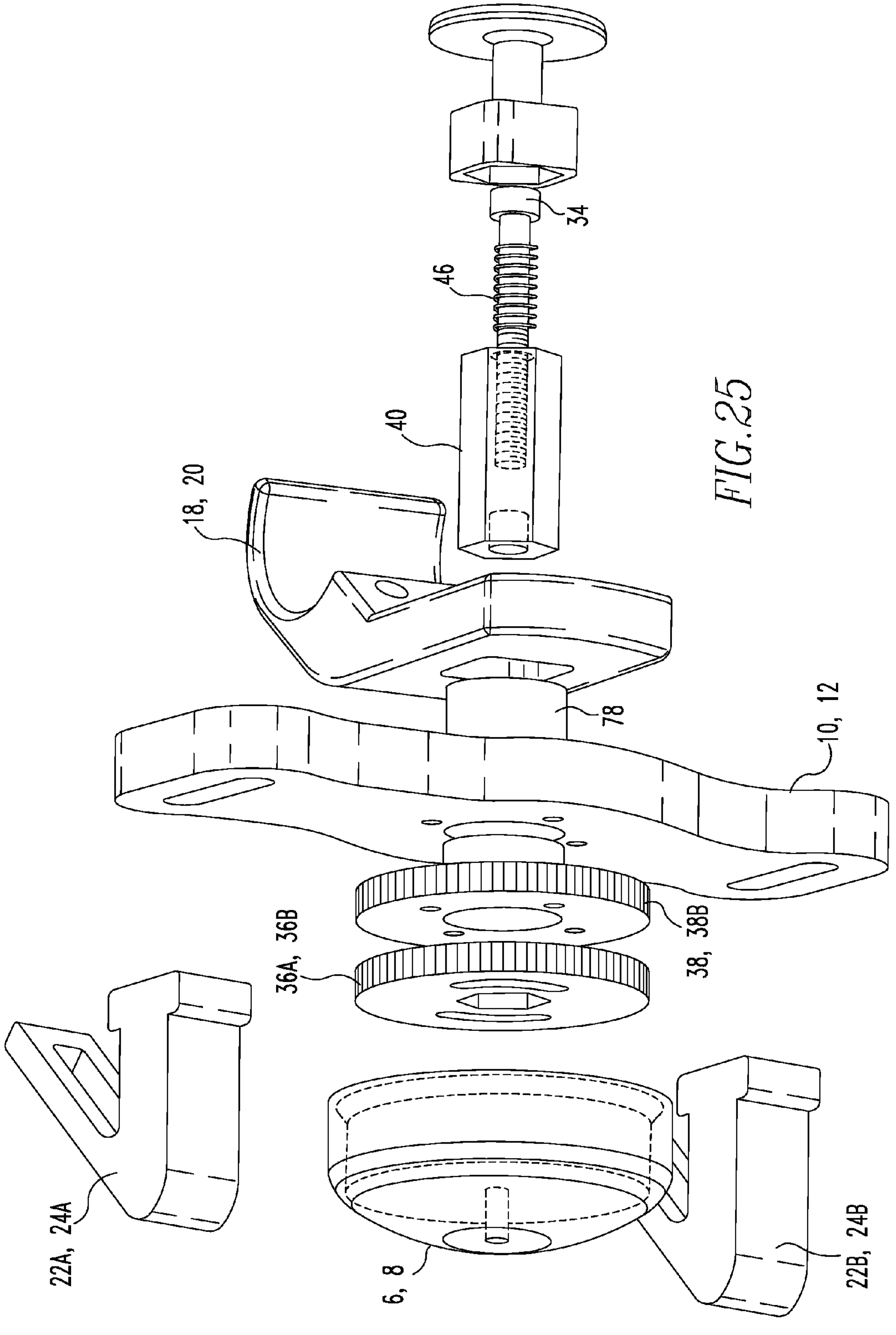
FIG. 25 is an exploded view of the embodiment of the present invention of FIG. 1.

One embodiment of the present invention is illustrated as an exploded view in FIG. 25 and discussed in detail below.

Figure 1:
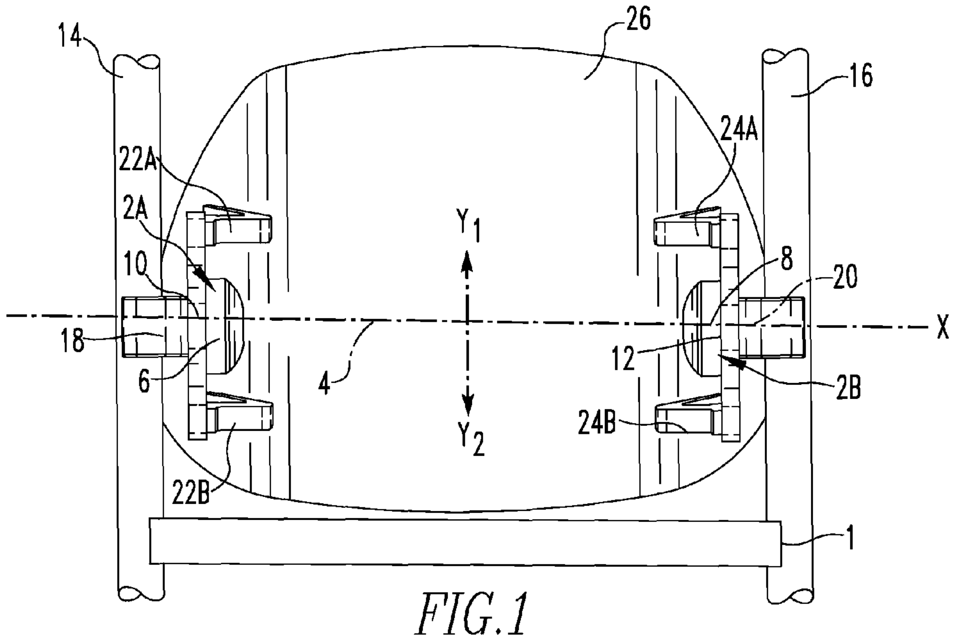
FIG. 1 is a pictorial illustration of one embodiment of the present invention with the covers in a closed or locked position.
Figure 2:
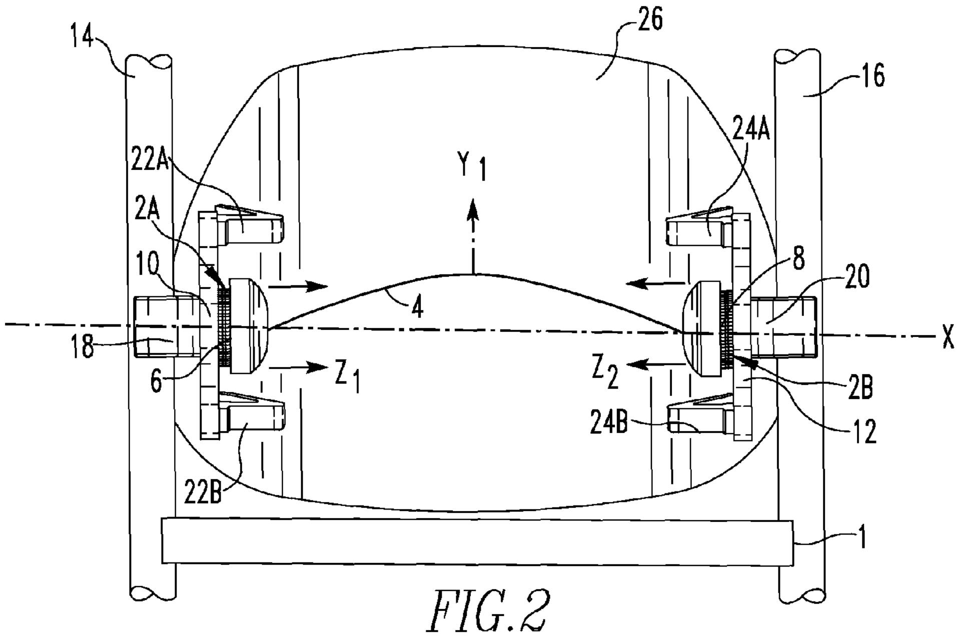
FIG. 2 is a pictorial illustration of the embodiment of the present invention of FIG. 1 with the covers in an opened or released.
Figure 3:
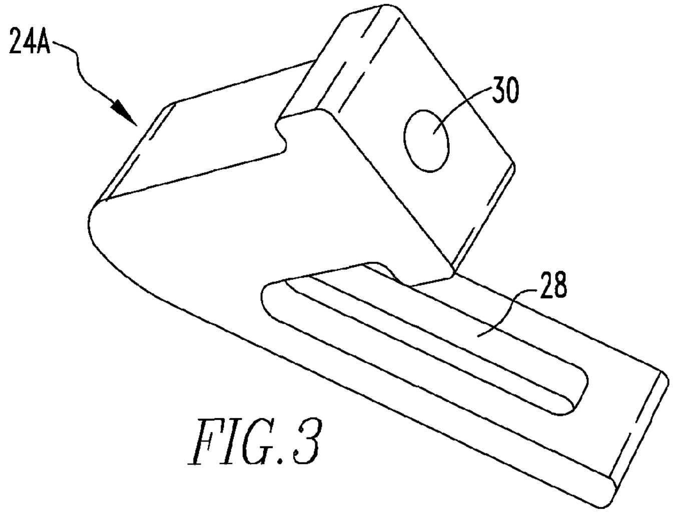
FIG. 3 is a pictorial illustration of a J-shaped bracket of the angle adjustment mechanism of FIG. 1.

Now turning to FIGS. 1-3 illustrating one embodiment of the present invention including a mechanism 2A, 2B of adjusting angular position of backrest 26. J-shaped brackets 22A, 22B, 24A, 24B shown in FIG. 3 are connected to backrest 26. J-shaped brackets 22A, 22B, 24A, 24B have slots 28 so that it can be adjustably attached to backrest 26 for positioning of backrest 26 with wheelchair tubing 14, 16 to accommodate varying widths between wheelchair tubings 14, 16. J-shaped brackets 22A, 22B, 24A, 24B have a tapped hole 30 to receive a screw (not shown) for adjustably attaching J-shaped brackets 22A, 22B, 24A, 24B to slots 32 of pivot bars 10, 12 for fore-aft adjustment of backrest 26.

Figure 4:
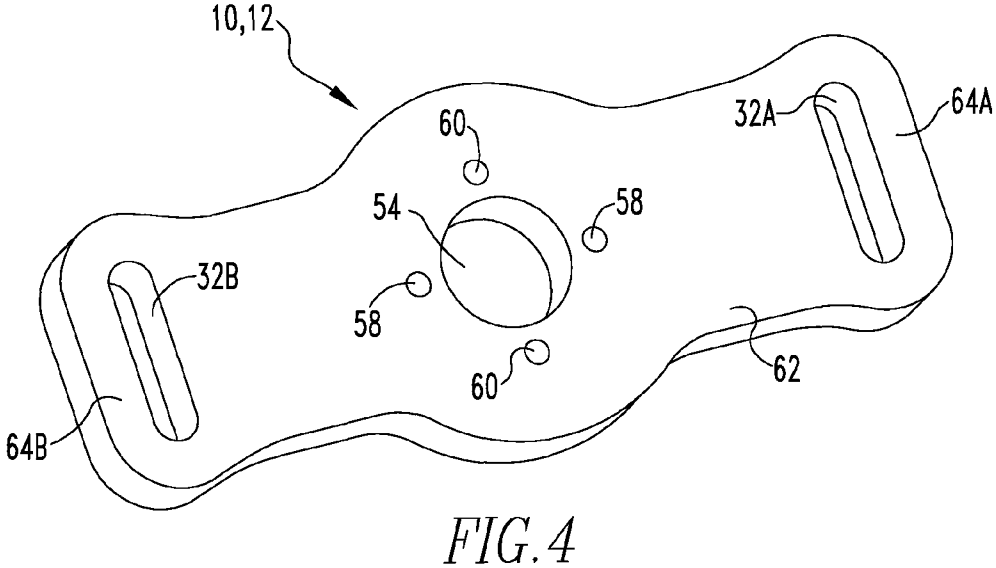
FIG. 4 is a pictorial illustration of an exemplary pivot bar of the present invention of FIG. 1.

Now turning to FIG. 4 further illustrating pivots bar 10, 12. As shown in FIGS. 1 and 2, pivot bars 10, 12 are disposed between two J-shaped brackets 22A, 22B, 24A, 24B and tubing attachment brackets 18, 20. Pivot bars 10, 12 include two slots 32*a*, 32B at ends 64A, 64B of each side of the wheelchair for horizontal (fore-aft) adjustment and hex nut hole 54 at center 66 of pivot bars 10, 12 for placement of round insert 78 t receive therein hex rod 40. Pivot bars 10, 12 will pivot on the outer surface 41 of round insert 39. Four (4) holes are positioned around hex nut hole 54 to receive screws that hold inner gear 38. The shape of pivot bars 10, 12 are substantially rectangular with circular shaped center portion 68 to contour to the shape of gears 36, 38 and covers 6, 8 to prevent dust from entering the gear compartment.

Figure 24A:
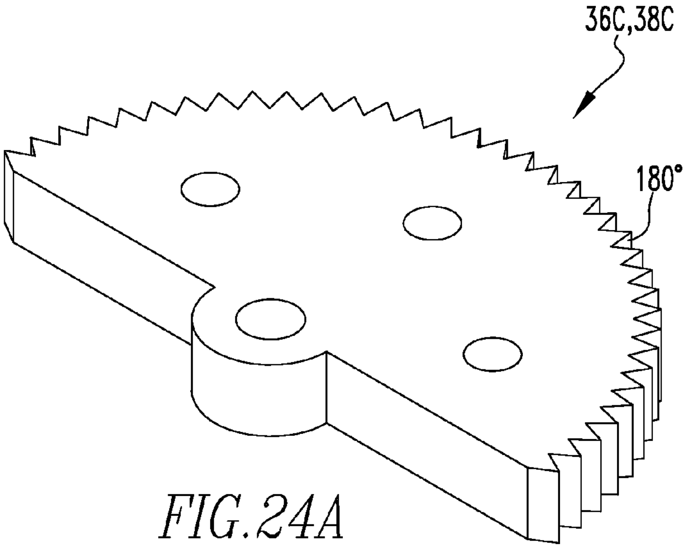
FIGS. 24A-F are pictorial illustrations of an alternative semi-circular embodiment of the gears of the present invention.
Figure 24B:
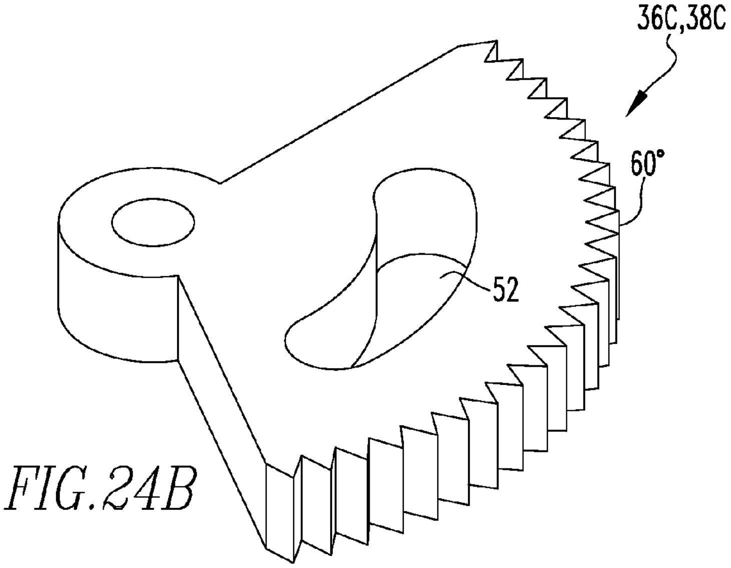
Figure 24C:
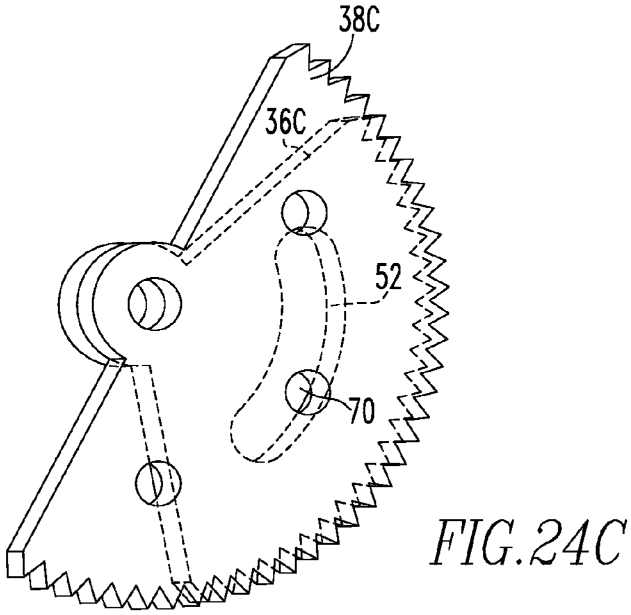
Figure 24D:
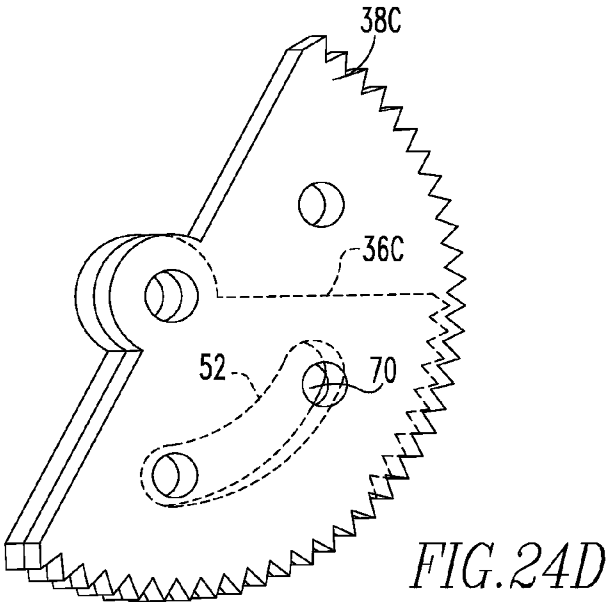
Figure 24E:
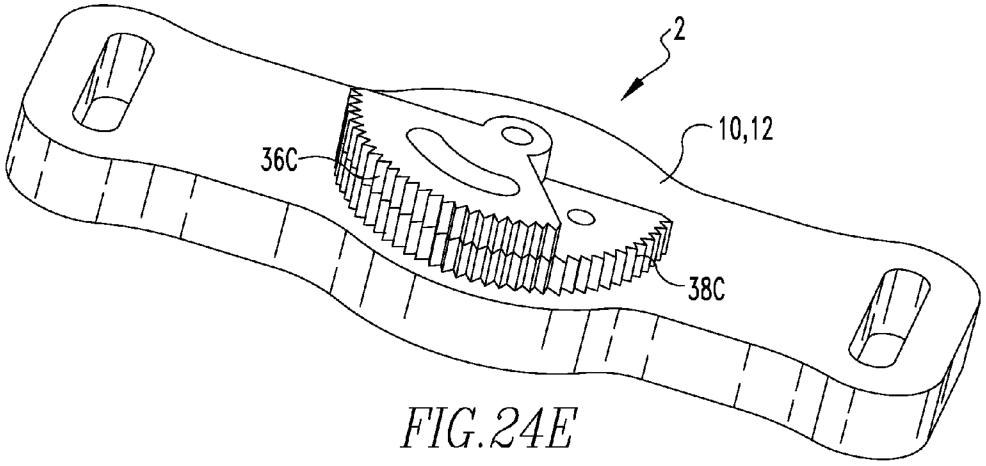
Figure 24F:
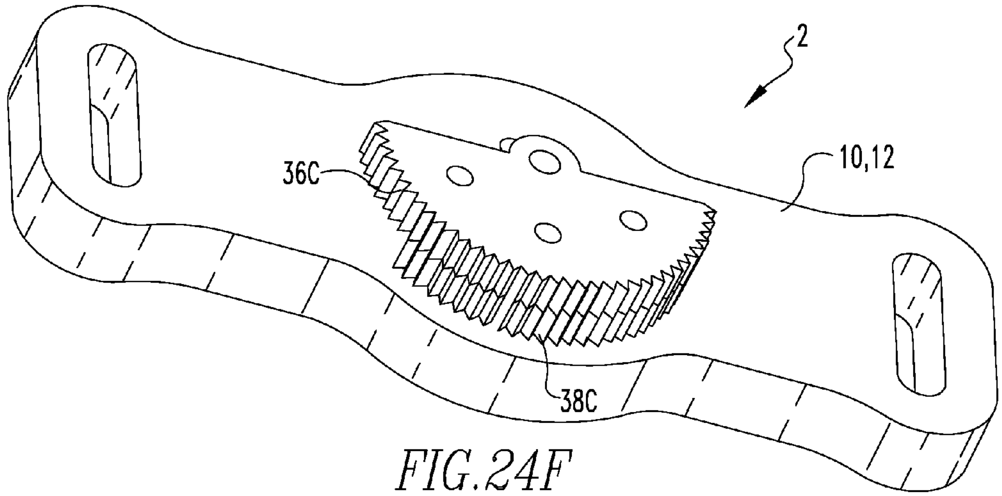

FIGS. 24A-E illustrate alternative gears can are less than 360° circumference or full-circle. Though any semi-circular angle is acceptable, examples of acceptable segments can be an outer gear 36C and/or inner gear 38C being 180° (FIG. 24A) or being 60° (FIG. 24B). FIGS. 24C and 24D illustrate relation rotational movement of inner gear 38C (180°) with outer gear 36C (60°) as limit pin 70 of inner gear 38C travels within angular position slot 52 of outer gear 36C. FIG. 24E is an illustration of inner gear 38C (180°) with outer gear 36C (60°) assembled in mechanism 2. FIG. 24F is an illustration of outer gear 36C (180°) with inner gear 38C (60°) assembled in mechanism 2.

Figure 5:
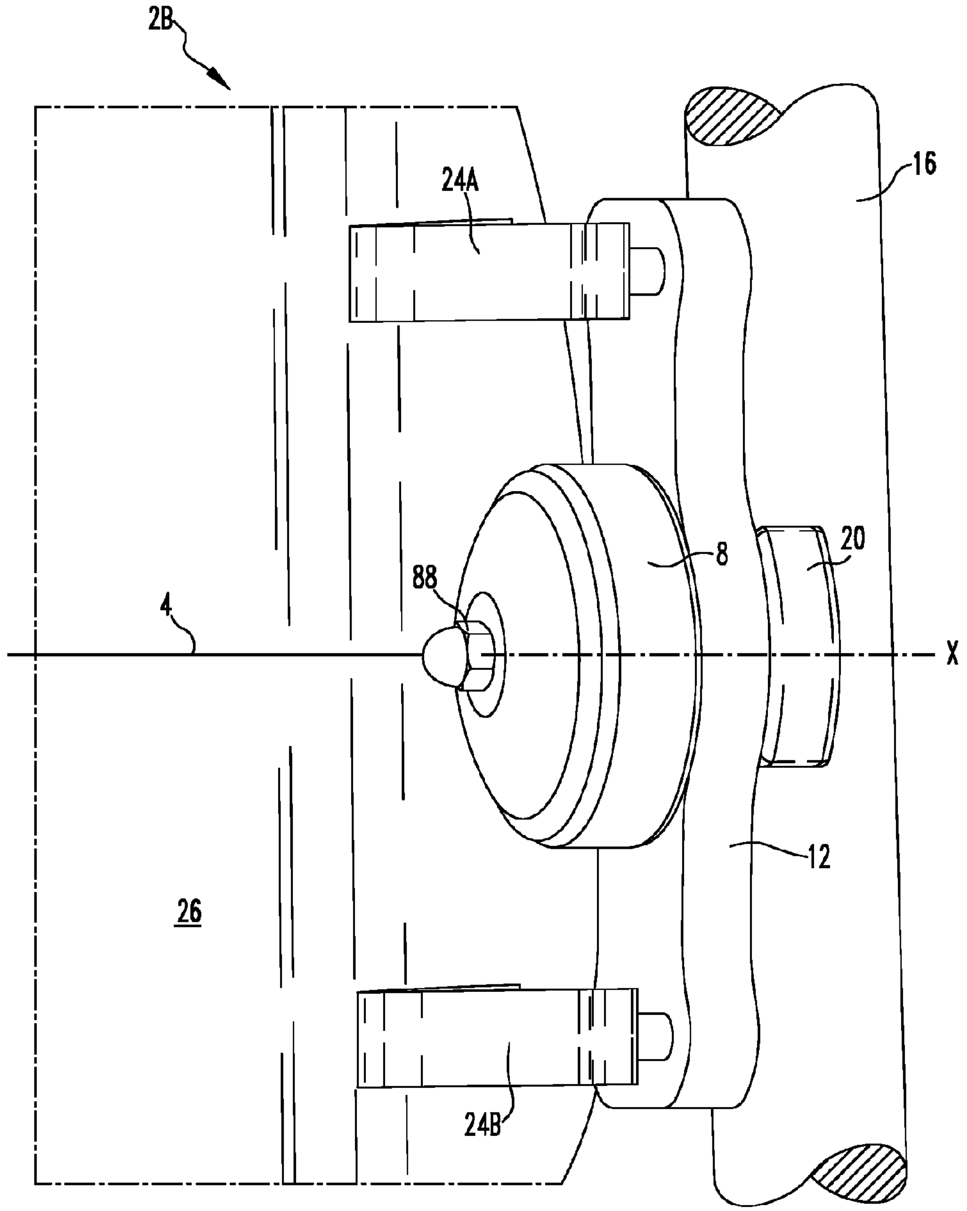
FIG. 5 is a pictorial illustration of the right angle adjustment mechanism and wheel chair mounting attachments with right cover in closed or locked position.
Figure 6B:
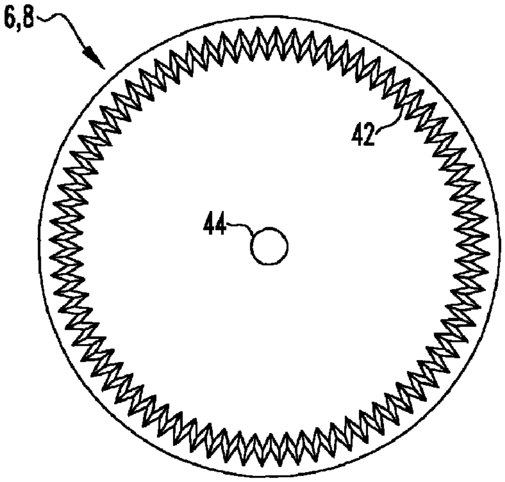
FIGS. 6B-E are an internal, side, and top views of the exemplary cover of FIG. 6A.
Figure 6C:
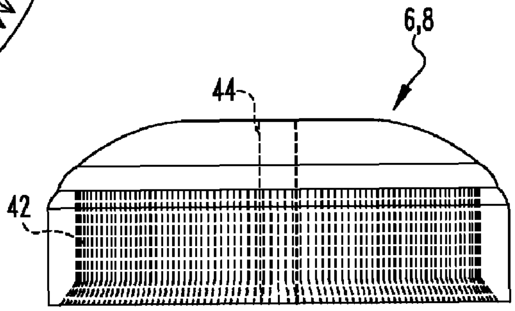
Figure 6D:
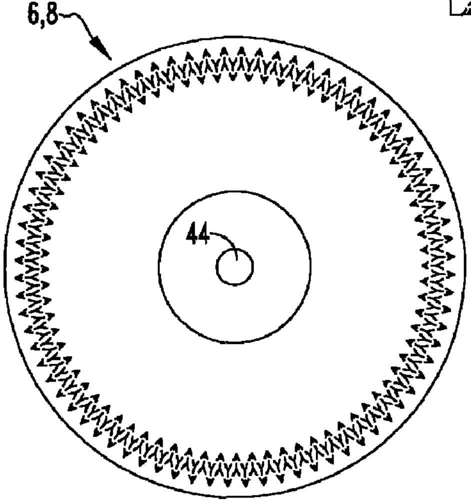
Figure 6A:
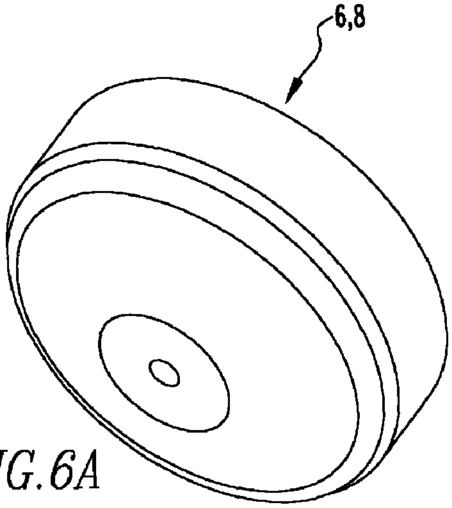
FIG. 6A is a pictorial illustration of an exemplary cover of the present invention of FIG. 1.
Figure 6E:
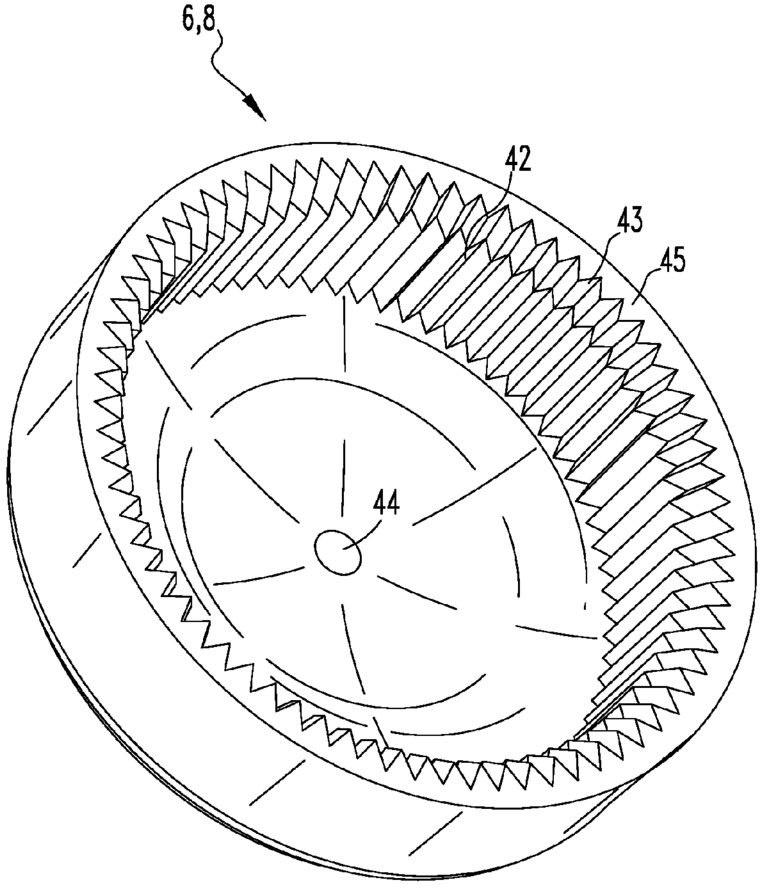

Now turning to FIG. 5 illustrating the right angle adjustment mechanism 2B and wheel chair mounting attachments with right cover 8 in closed or locked position to fix backrest 26 position. FIGS. 6A-E illustrate covers 6, 8 include internal female gears 42 that slide over and mesh with male gears of outer gear 36 and inner gear 38 when gears 36, 38 are aligned (FIG. 7), rotationally constraining these gears. Covers 6, 8 include threaded hole 44 that is screwed on to release screw 34 whereby covers 6, 8 travel with release screw 34 along common longitudinal axis X when release screw 34 is pulled outward away from outer gear 36 and inner gear 38 to disconnect inner gear 38. Covers 6, 8 also can be designed (as shown in FIG. 6E) with a bevel 43 at opening edge 45 of the gear which helps align gears 36, 38. Outer gear 36 and inner gear 38 are not rotationally constrained to each other when cover 6, 8 are in opened or released position Bracket 20 is attached to wheelchair tubing 16. J-shaped bracket 24A, 24B are connections between pivot bar 12 and backrest 26 to secure pivot bar 12 to backrest 26.

Figure 7:
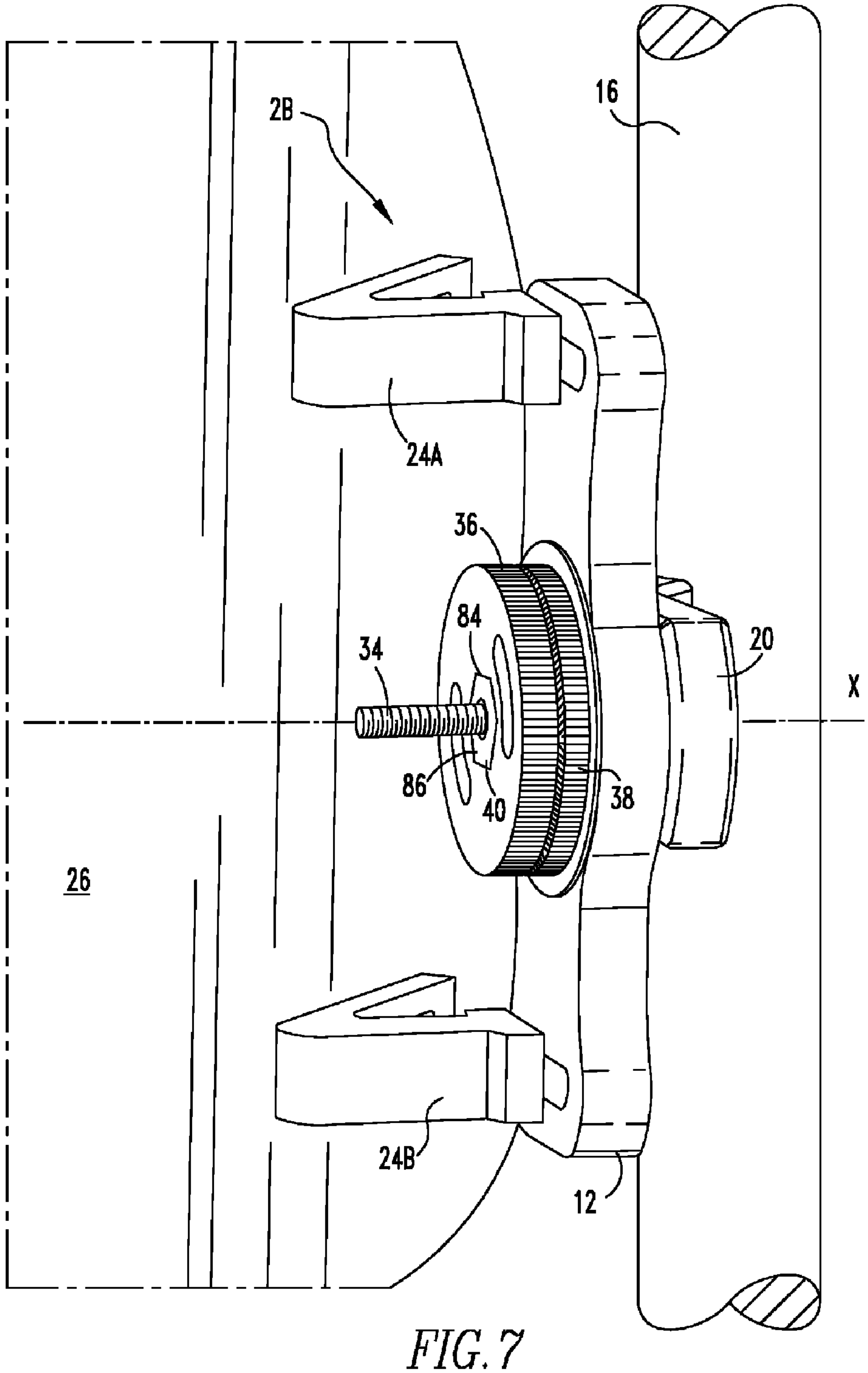
FIG. 7 is a pictorial illustration of the right angle adjustment mechanism and wheel chair mounting attachments without right cover.

Now turning to FIG. 7, outer gear 36 and inner gear 38 are positioned adjacent to one side of pivot bar 12. Inner gear 38 is fixedly attached to pivot bar 12 and outer gear 36 is connected to hex rod 40 and fixedly attached to tubing attachment bracket 20. Whereby, inner gear 38 moves or rotates with pivot bar 12 about common longitudinal axis X and outer gear 36 is static relative to tubing attachment bracket 20. To set backrest 26 in one position, covers 6, 8 lock outer gear 36 and inner gear 38 moving relative to the other when at least one male gear tooth of the outer gear 36 and inner gear 38 align and the female gear teeth of covers 6, 8 mesh over the male gear teeth of the outer gear 36 and inner gear 38.

An alternative embodiment of the present invention does not include outer gear 38 and only relies on covers 6, 8 female internal gears to carry operational loads and being attachable to attachment brackets 18, 20.

Figure 9:
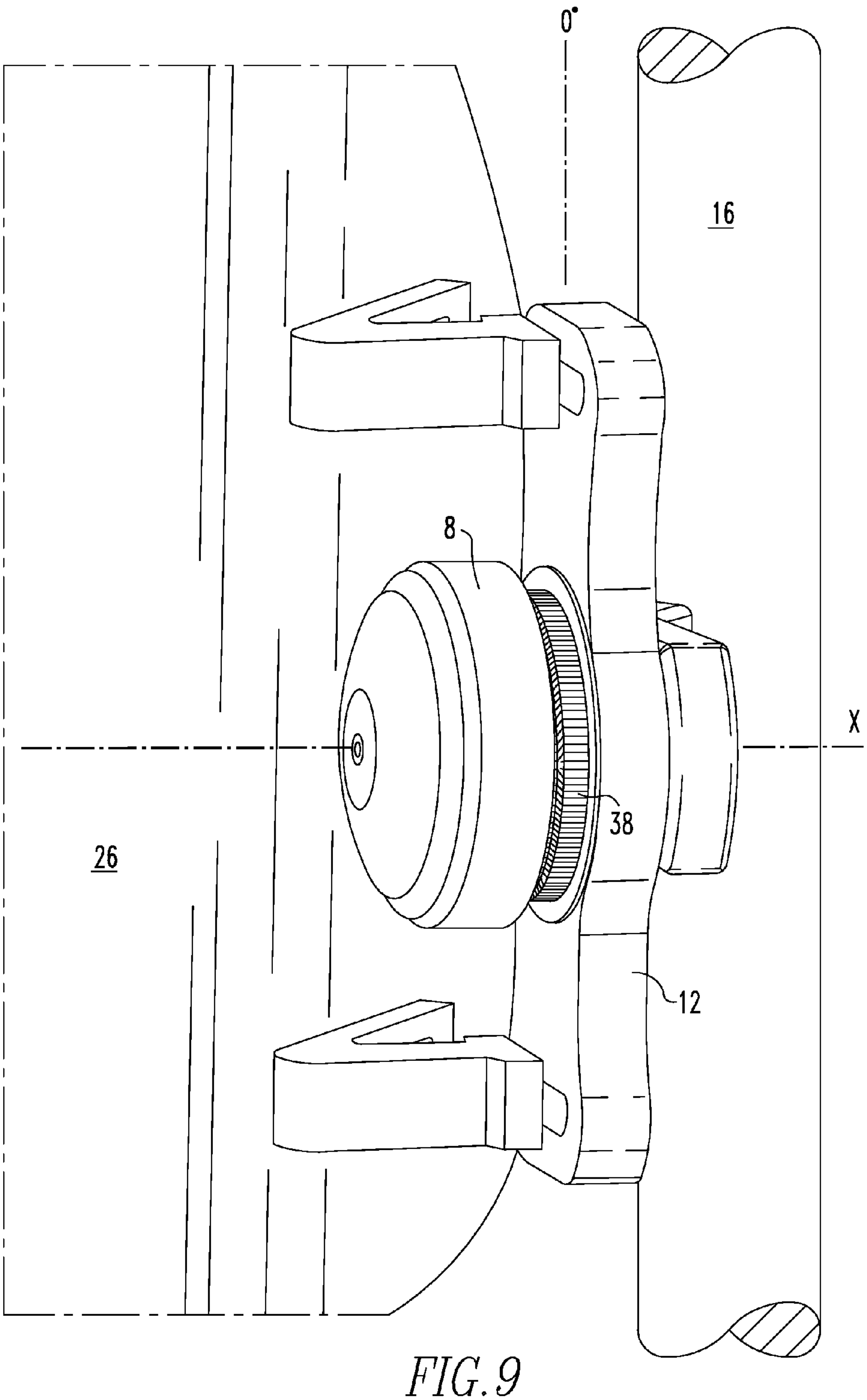
FIG. 9 is a pictorial illustration of an exemplary cover of the present invention of FIG. 1 in an opened or released position in 0° or centered position.

As shown in FIG. 9, cover 8 slides outward relative to outer gear 36 and inner gear 38 to disengage inner gear 38 relative to outer gear 36 while cover 8 still engages outer gear 36 such that backrest 26 can pivot backward (FIG. 10) or forward (FIG. 11) together with inner gear 38 and pivot bar 12. Covers 6, 8 are pulled inward towards the other cover in opposing directions $Z_1$, $Z_2$ simultaneously for disengaging gears, as shown in FIG. 2. For one hand manipulation, covers 6, 8 are connected by a pull string or rope 4. One embodiment of pull string 4 can be polyester rope with 3/32 inch diameter. The gears are repeatedly disengaged and engaged by pulling and releasing pull string or rope 4. Biasing devices, for example springs 46 integral with hex rod 40, can biases covers 6, 8 back to their original positions. Only one hand can be used for quick release without a certain amount of strength. Pulling pull string or rope 4 also could be done by gross movement or a single actuation in a vertical direction $Y_1$ or $Y_2$ at any position along length of pull string 4. As a result, dexterity is not required to adjust the backrest angle. Therefore, the position of body might be stable when wheelchair users recline.

Figure 8:
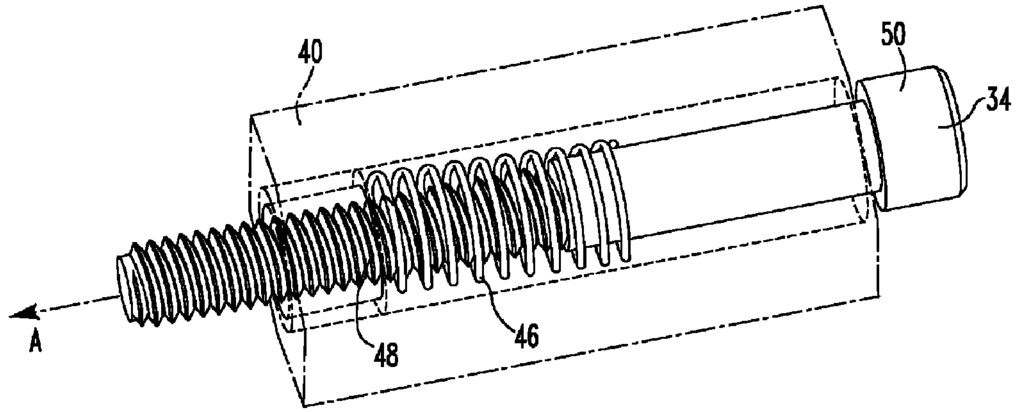
FIG. 8 is a pictorial illustration of an exemplary hex rod of the present invention of FIG. 1.

Release screw 34 can be integral to hex rod 40 as shown in FIG. 8. Internal spring 46 is compressed against shoulder 48 by screw head 50 when release screw 34 is pulled in direction A by pull string 4 to release outer gear 36 and inner gear 38. Once tension on pull string 4 is removed, then compressed internal spring 46 is decompressed to return to its original position moving covers 6, 8 into closed or locked position interconnecting outer gear 36 and inner gear 38.

Figure 10:
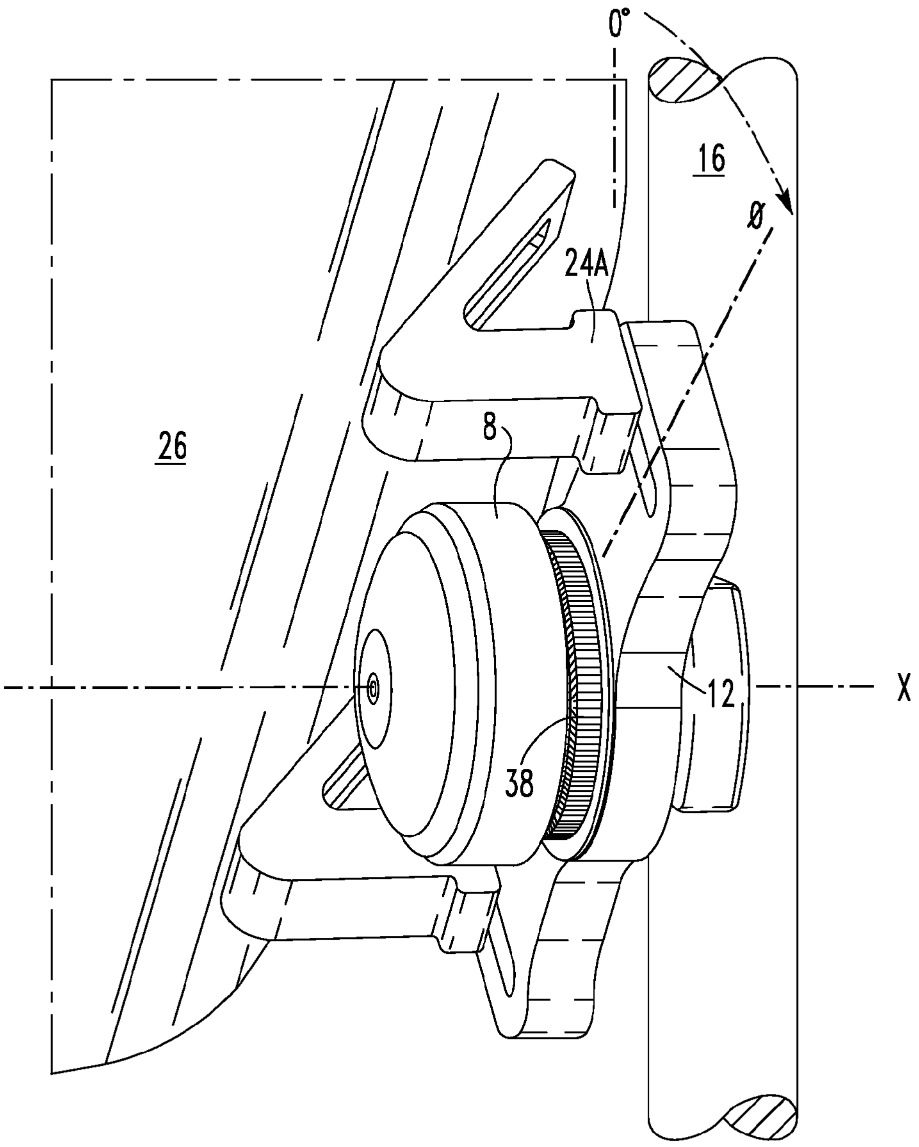
FIG. 10 is a pictorial illustration of the present invention of FIG. 1 adjusted backward to angle Ø
Figure 11:
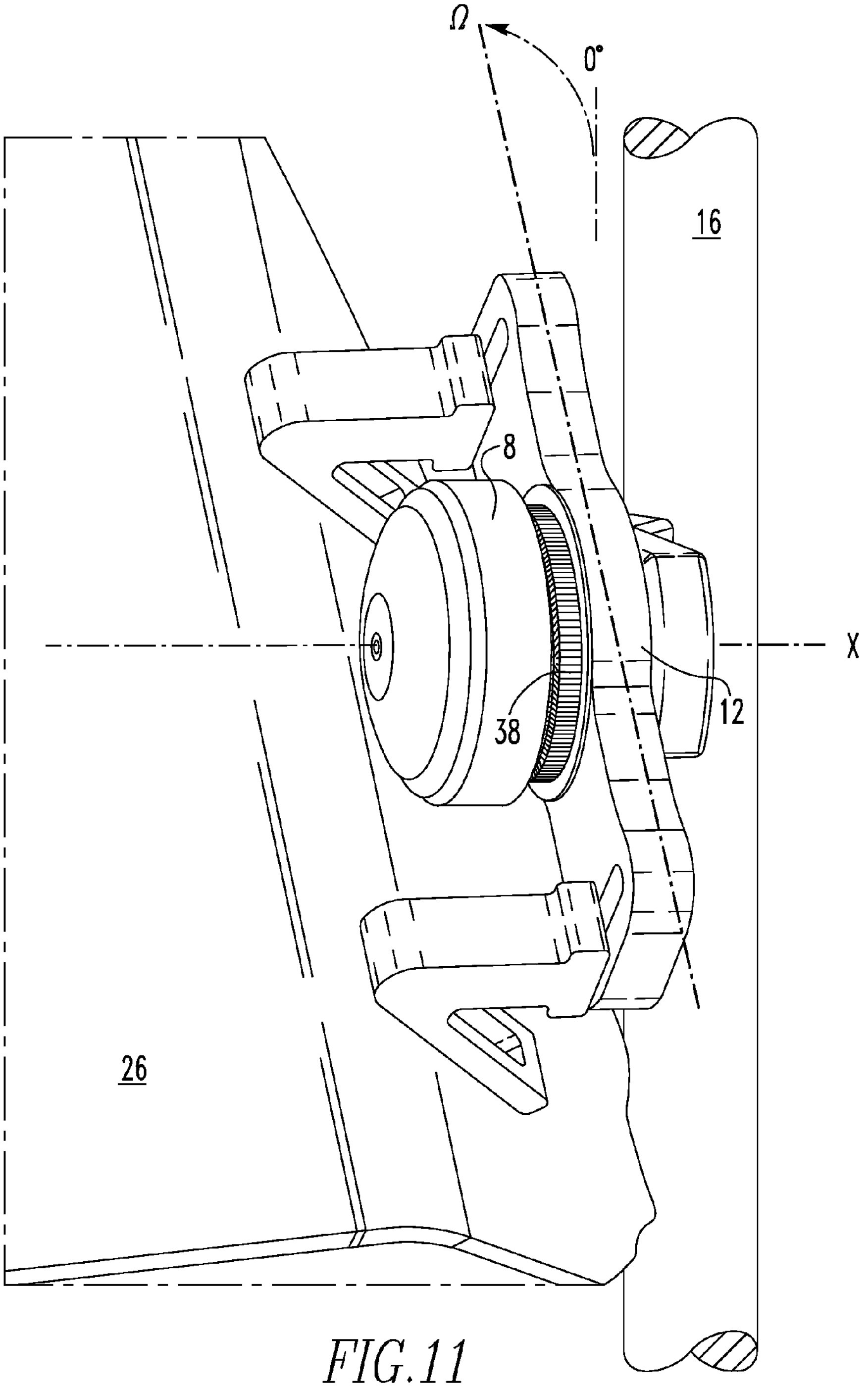
FIG. 11 is a pictorial illustration of the present invention of FIG. 1 adjusted forward to angle Ω.
Figure 12:
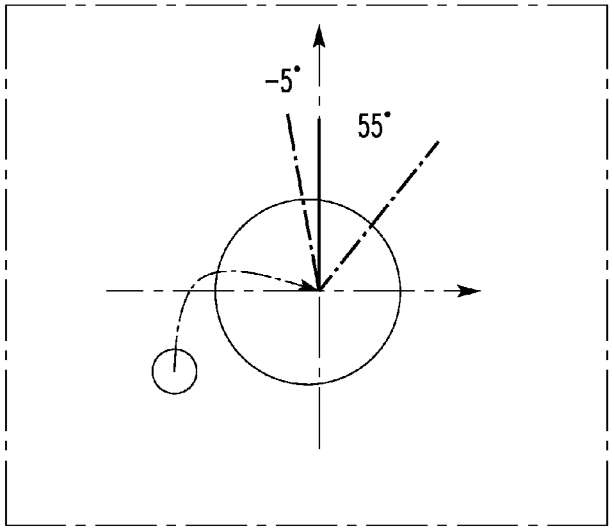
FIG. 12 is a graphical representation of an exemplary angular rotation of the backrest relative to wheelchair tubing.

Now turning to FIGS. 9-12 illustrating the angular adjustment of backrest 26 relative to wheelchair tubing 16. FIG. 9 is a pictorial view of an exemplary cover 8 of the present invention of FIG. 1 in an opened or released position in 0° or centered position. FIG. 10 is a pictorial view of the present invention of FIG. 1 adjusted backward. FIG. 11 is a pictorial view of the present invention of FIG. 1 adjusted forward. FIG. 12 is a graphical representation of an exemplary angular rotation of the backrest relative to wheelchair tubing ranging, for example, from an incline of Ω (for example, −5°) to a recline of Ø (for example, +55°). However, an incline angle and recline angle is within the contemplation of this invention.

Figure 13:
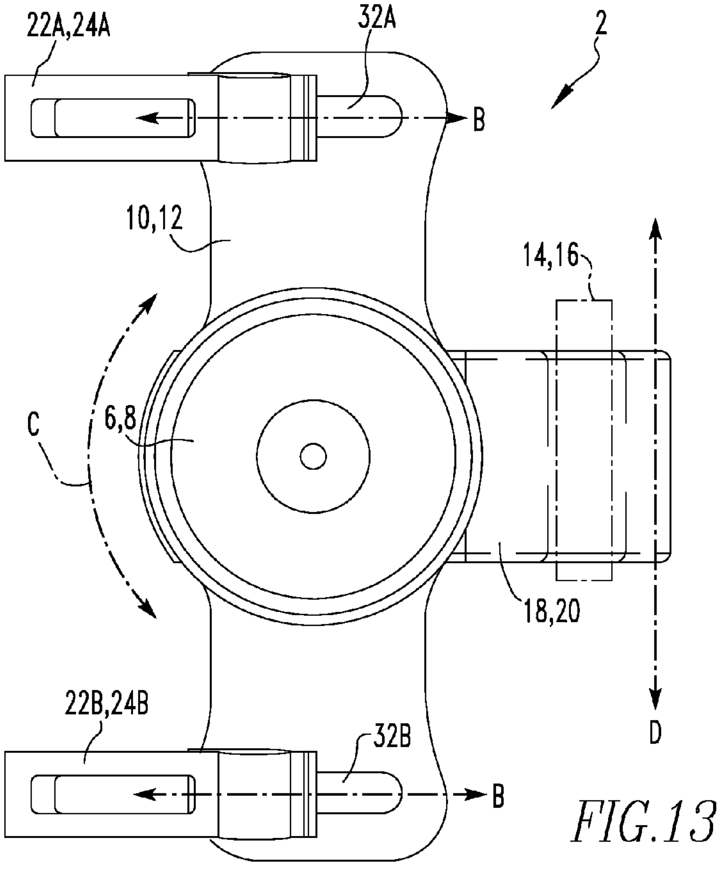
FIG. 13 is pictorial illustration of the degrees of motion of the angle adjustment mechanism of FIG. 1.

FIG. 13 illustrates the degrees of motion of one embodiment of the angle adjustment mechanism. Pivot bars 10, 12 rotate in direction C to adjust the angle of backrest 26 (attached to J-shaped brackets 22A, 22B, 24A, 24B). J-shaped brackets 22A, 22B, 24A, 24B traverse in direction B within pivot bar slot 32A, 32B relative to pivot bars 10, 12 to set a horizontal (fore-aft) position of backrest 26. Tubing attachment brackets 18, 20 traverse in direction D relative to wheelchair tubing 14, 16 to set vertical height of backrest 26.

Figure 14:
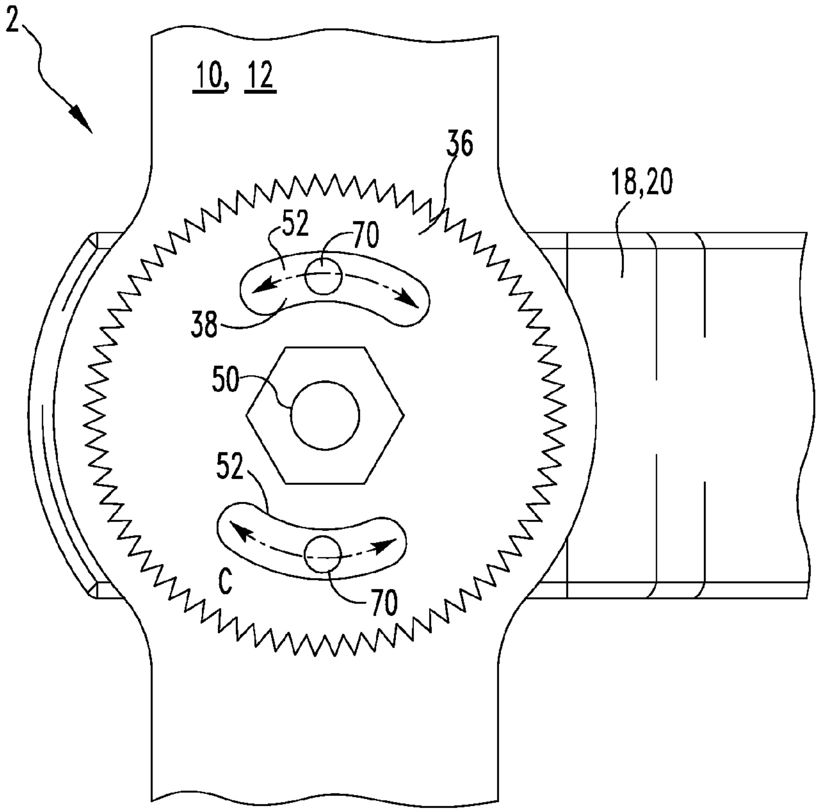
FIG. 14 is a pictorial illustration of a magnification of FIG. 13 without cover to illustrate the assembly of the gear relative to the pivot bar and the tubing attachment brackets.

FIG. 14 is a magnified view of FIG. 13 without covers 6, 8 to illustrate the assembly of outer gear 36 and inner gear 38 to pivot bar 10, 12 and tubing attachment brackets 18, 20.

Figure 15:
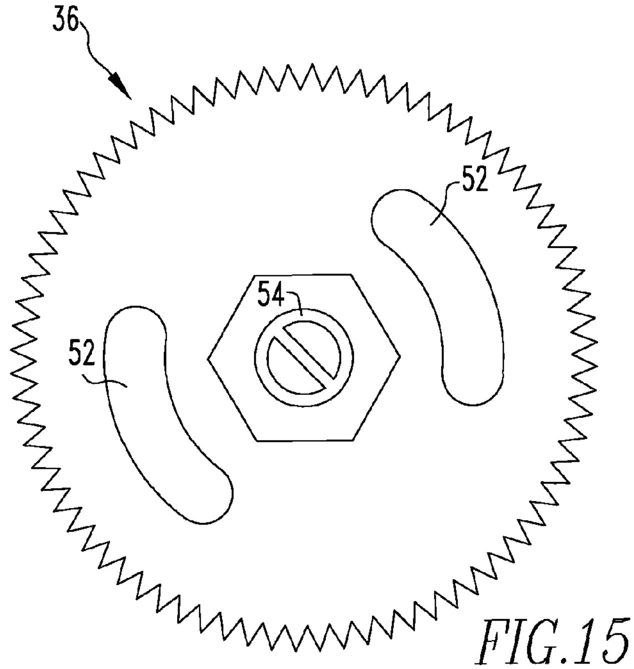
FIG. 15 is a pictorial illustration of an exemplary embodiment of an outer gear of the present invention of FIG. 1.
Figure 16:
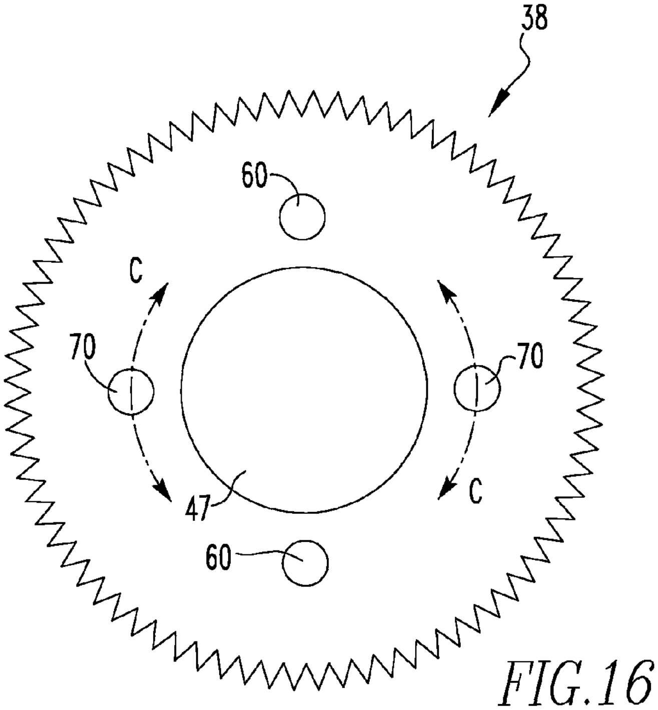
FIG. 16 is a pictorial illustration of an exemplary embodiment of an inner gear of the present invention of FIG. 1.

Now turning to FIGS. 15 and 16 for a discussion of outer gear 36 and inner gear 38. Outer gear 36 includes hex rod hole 54 sized to receive hex rod 40 and angular position limit slots 52 sized to freely receive limit pin 70 in inner gear 38. Hex rod 40 is secured to outer gear 36 by conventional securing mechanisms including but not limited to welding or interference fit with the hex rod hole 54. Round insert 78 (FIG. 25) with hex shaped hole is received into insert hole 47. Inner gear 38 is free to rotate in direction C until stopped by limit pins 70. Though gears 36, 38 are illustrated as straight, non-tapered gears in this application, other gear designs such as an angle tapered spline or tapered straight gears, such as outer tapered gear 36T, inner tapered gear 38T (see FIGS. 22A-C) are also within the contemplation of the invention.

Figure 22A:
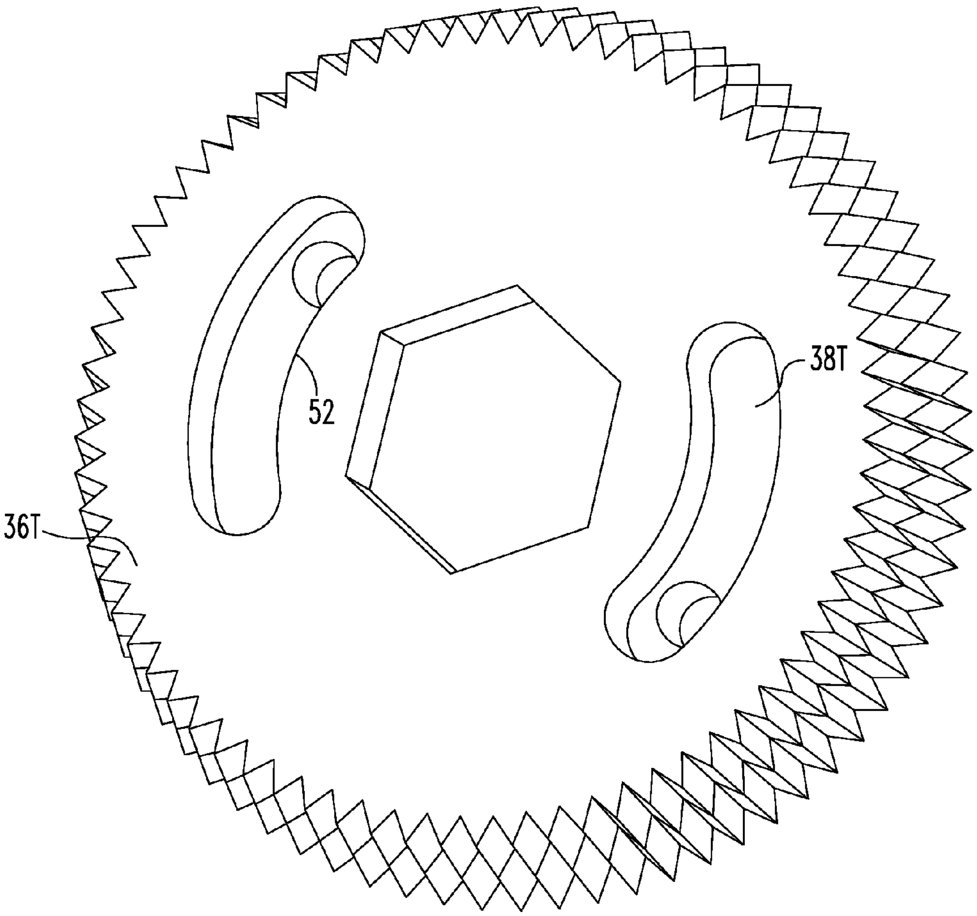
FIGS. 22A-C are pictorial illustrations of tapered gears of another embodiment of the present invention.
Figure 22B:
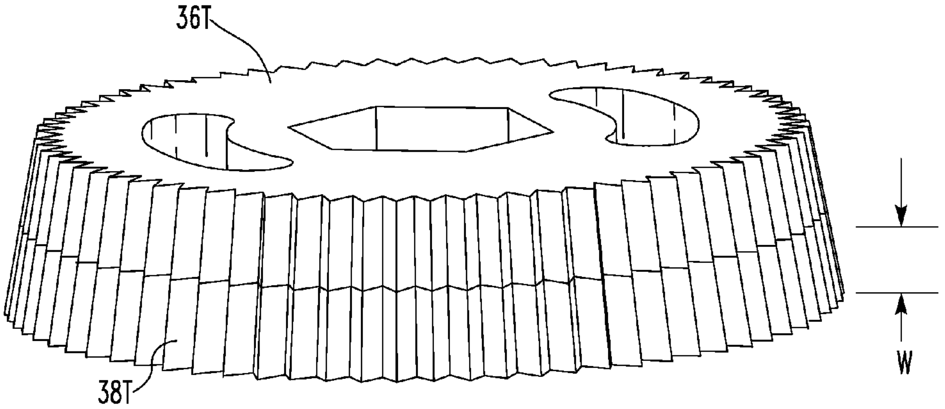
Figure 22C:
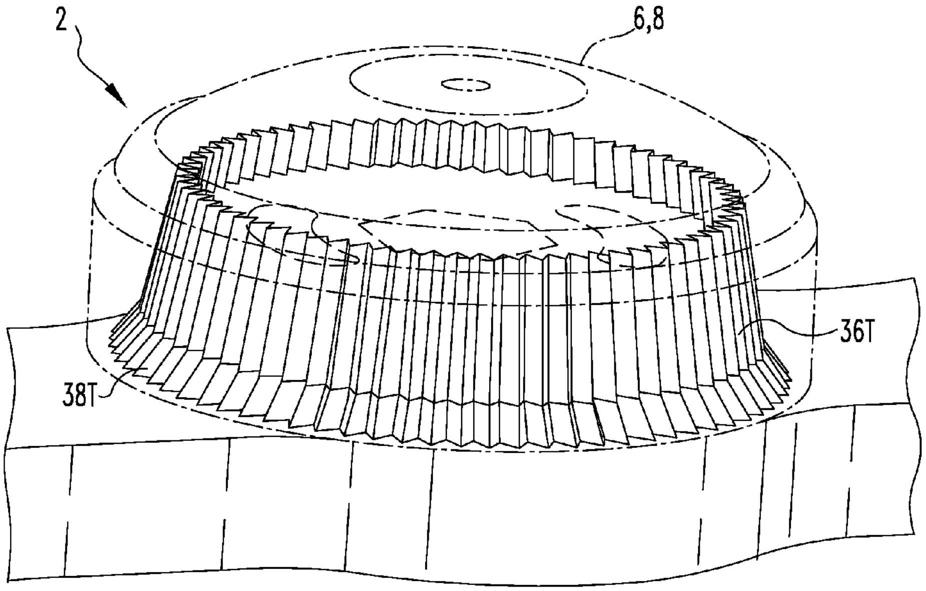

FIGS. 22A and 22B are illustrates outer tapered gear 36T angular position slot 52 aligned adjacent inner tapered gear 38T. Figure is an illustration of tapered gears 36T, 38T assembled in mechanism 2. One embodiment of mechanism 2 allows for automatic adjustment between covers 6, 8 and inner tapered gear 38T to maintain tightness of fit therebetween. Either there is a gap between inner tapered gear 38T and pivot bars 10, 12 to accommodate cover female internal gear wear as the covers 6, 8 move inward toward the outer and inner gears due to the spring load to form a tighter fit with the outer and inner gears, or the initial/new fit between covers 6, 8 to inner tapered gear 38T is that female internal gear teeth 42 of covers 6, 8 do not engage the entire depth or width W of the male gear teeth of inner tapered gear 38T. In the latter case, covers 6, 8 will progressive move over the entire depth or width of the male gear teeth of inner tapered gear 38T as the female internal gear teeth 42 of covers 6, 8 wear.

Figure 17:
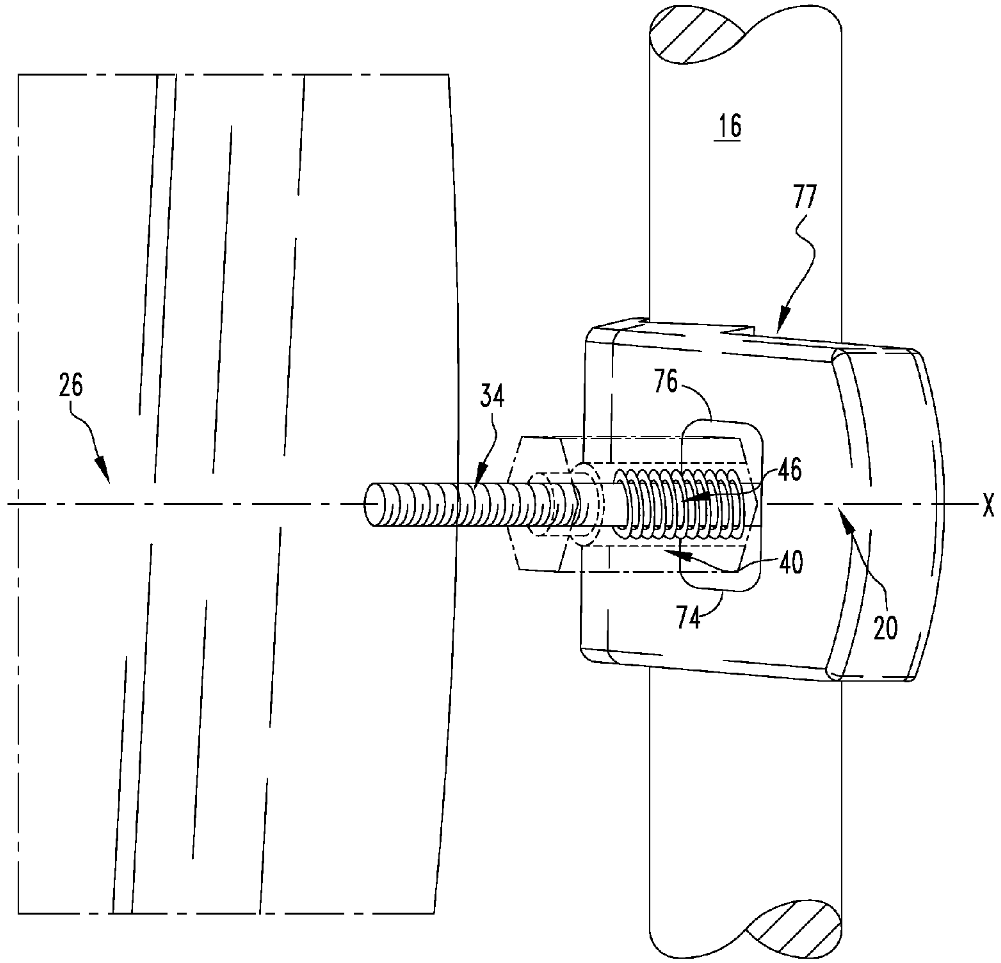
FIG. 17 is a pictorial illustration of an exemplary embodiment of a tubing attachment bracket of the present invention of FIG. 1.

Now turning to FIGS. 17 and to illustrate the assembly of present invention. Square insert 74 is inserted into hole 76 of tubing attachment bracket 20 and hex rod 40 is secured into hole 74 of square insert 76 to form a static subassembly 77 either before or after tubing attachment bracket 20 is attached to wheelchair tubing 16.

Figure 18:
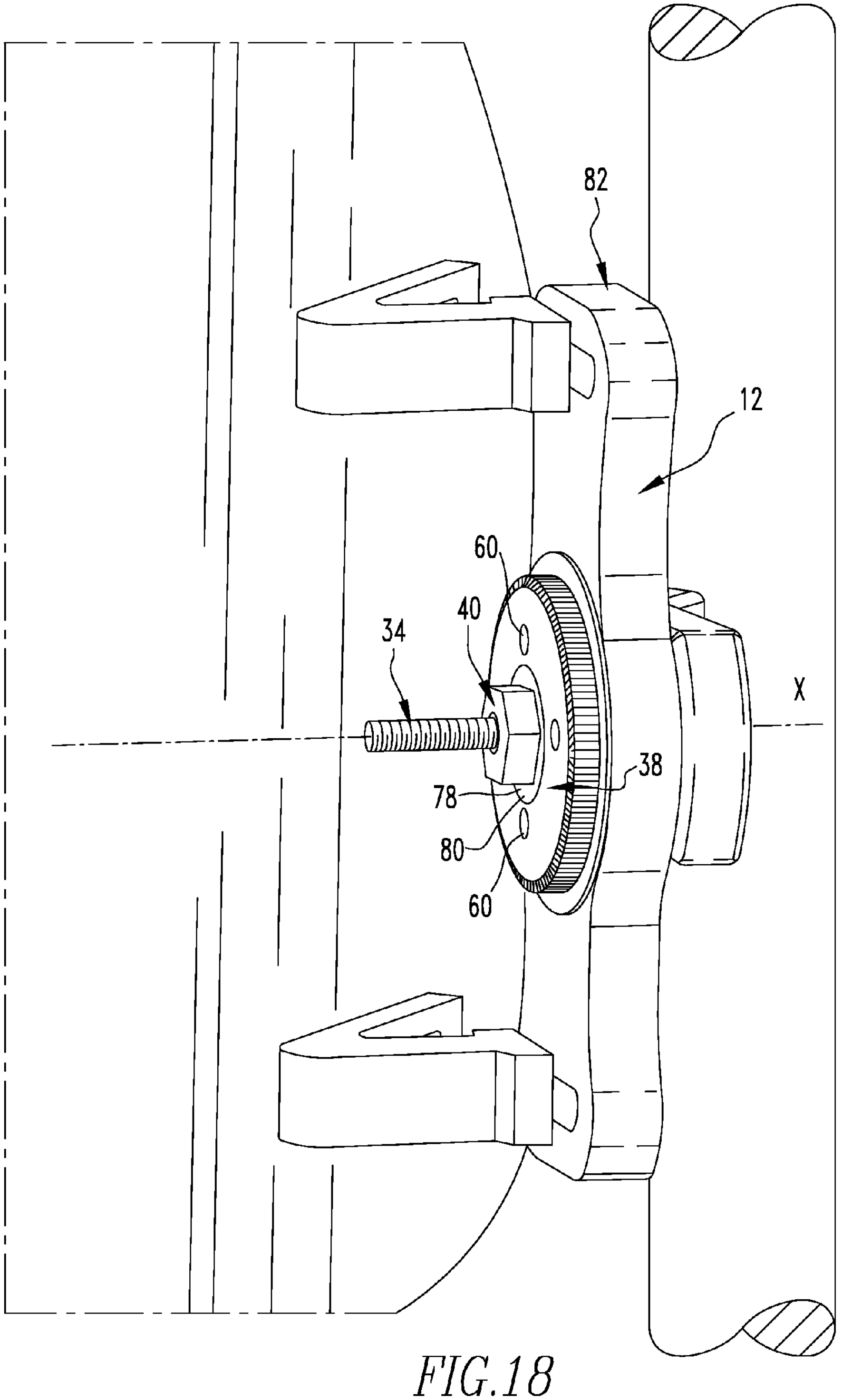
FIG. 18 is a pictorial illustration of an exemplary embodiment of the pivot bar and inner gear of the present invention of FIG. 1.

Now turning to FIG. 18 to illustrate the assembly of pivot bar 12 and inner gear 38 to tubing attachment bracket 20. Inner gear 38 include round insert 78 in its center hole 80. Inner gear 38 is fixedly attached to pivot arm 10 to form a rotatable subassembly 82. The outer gear 36 is fitted onto hex rod 40. Round insert 78 allows rotatable subassembly 82 to rotate independently relative to static subassembly 77.

Now returning to FIG. 7 to illustrate the further assembly of outer gear 36 to subassembly 77. Outer gear 36 is secured to hex rod 40 by conventional attachment techniques including but not limited to welding or interference fit between outer surface 84 of hex rod 40 and center hole 86 of outer gear 36. Cover 8 (FIG. 5) is now screwed onto release screw 34 through threaded hole 44 and pull string 4 is attached to a nut 88 (FIG. 5) screwed onto screw 34 (FIG. 7) to actuate covers 6, 8 along a common longitudinal axis X, such that pivoting components (pivot bars 10, 12; inner gear 38) and static components (tubing attachment bracket 18, 20; outer gears 36; covers 6, 8) adjacent to pivoting components of the completed backrest adjustment mechanism 2 rotates about or is positioned along the same common axis X. The independent backrest adjustment mechanism 2A, 2B act in unison with only a single pull of pull string 4. Therefore, backrest 26 can be angle adjusted by only a single actuation of the actuation mechanism, for example a pull string 4.

Figure 20:
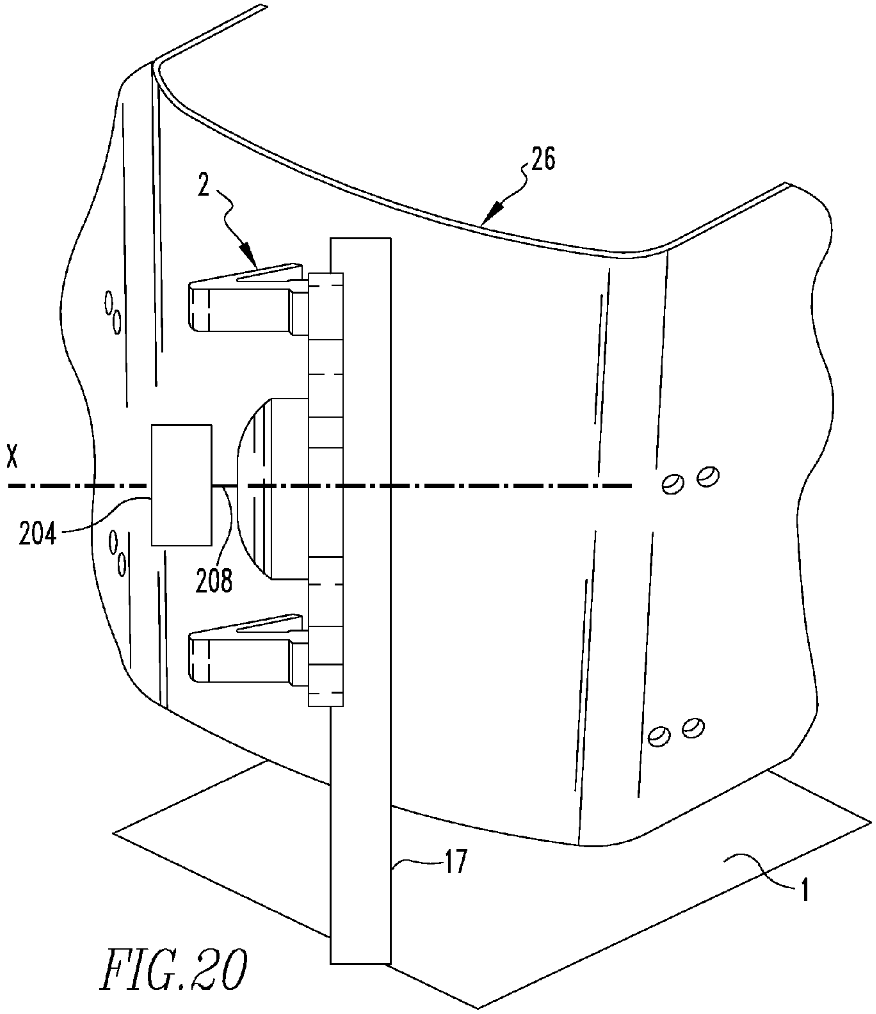
FIG. 20 is a pictorial illustration of another embodiment of the present invention having only a single backrest adjustment mechanism incorporated on to a wheelchair with only one wheelchair tubing.

Another embodiment of the present invention only includes a single backrest adjustment mechanism 2 when there is only one wheelchair tubing 17 to hold backrest 26 as shown in FIG. 20. Single backrest adjustment mechanism 2 includes cable or pull string 208 attached to handle 204. When handle 204 is pulled in a direction substantially along common longitudinal axis X, then mechanism 2 is released as described above.

Another embodiment of the present invention can include a quick-release mechanism for taking a part of backrest for folding wheelchair users. Quick release mechanism will improve transportability when the backrest is removed quickly instead of having to loosen the mounting screws.

Figure 21A:
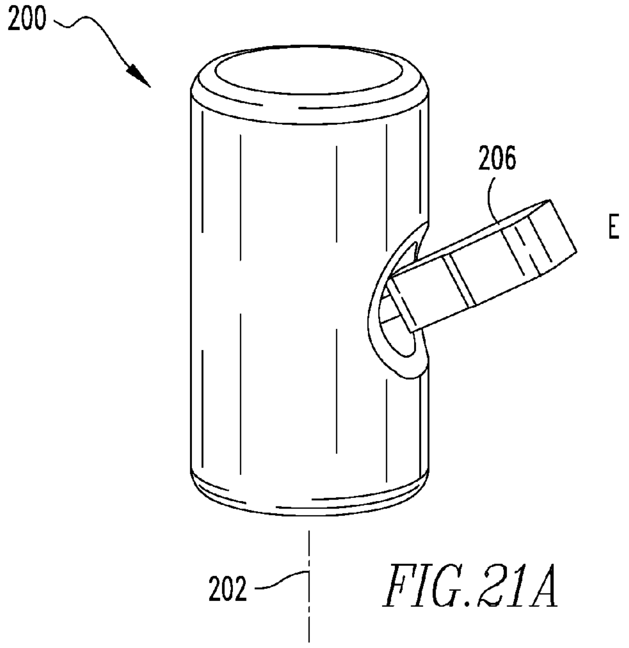
FIGS. 21A and 21B are pictorial illustrations of an exemplary remote control mechanism for the present invention to actuate the release mechanism to disengage the locked gears and to engage the gears free to rotate in a relative thereto.
Figure 21B:
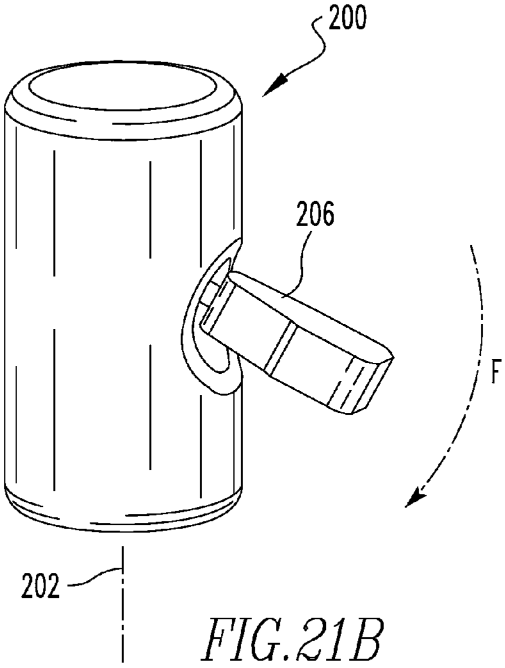
Figure 23:
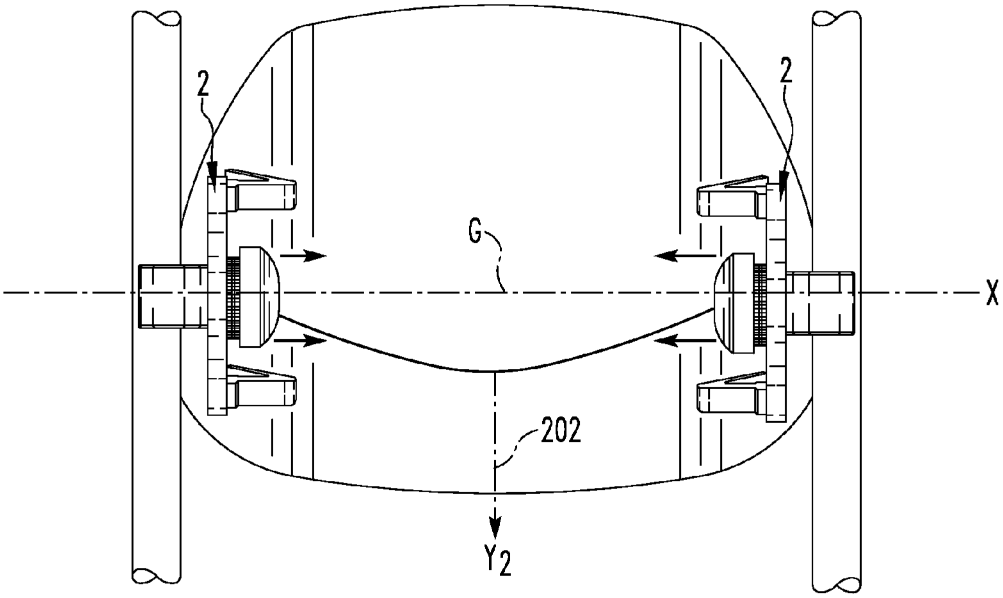
FIG. 23 is a pictorial illustration of the remote control cable disengaging the covers with actuation of the remote control mechanism of FIGS. 21A and 21B.

Another embodiment of the present invention can include a remote control 200 or push buttons for angle adjustment. For the angle adjustment, the mechanism 2 is on the back side of backrest 26 using a string 4 to pull in direction $Y_2$ for release mechanism 2 (FIG. 23). In addition to placing the angle adjustment actuation mechanism, e.g. pull string 4, on the back side of backrest 26, a remote control 200 with lever 206 (FIGS. 21A and 21B), similar to a bicycle brake cable, can be adapted to actuate cable 202 attached to pull string 4, which is attached to covers 6, 8 to draw covers 6, 8 toward each other ($Z_1$, $Z_2$) to release the gears 36, 38. FIG. 21A illustrates remote control 200 in locked position. FIG. 21B illustrates that cable 202 is drawn into remote control 200 when lever 206 is rotated in direction F. When lever 206 is released, lever 206 will return automatically to the locked position (FIG. 221) because spring 46 decompresses thereby closing covers 6, 8 and pulling cable 202 back to its original position (FIG. 23).

Another embodiment of the remote control can be adapted to select a pre-set angle. For example, angles can range from −5° to 55° with 72 teeth in the gears at 5° increments, so there are 12 different angle positions. Another embodiment includes 6 positions at 10° increments. Pre-set angles can also be customized to users' preference. The pre-sets would be perfect position for usual, reclined position for rest or dressing, forward position for working on tables and so on.

Figure 19:
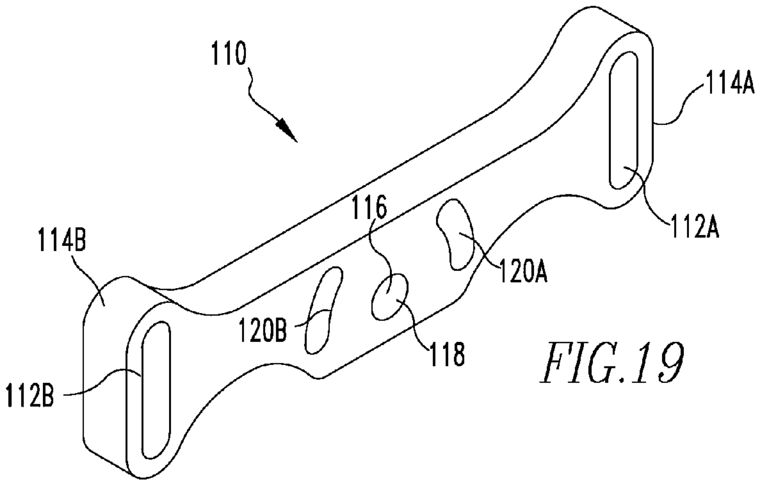
FIG. 19 is a pictorial illustration of an alternative pivot bar of the present invention.

An alternative pivot bar 110 is illustrated in FIG. 19. Pivot bar 110 has several slots and holes for different purposes. From the center of pivot bar 110, there are two symmetrical slots 112A, 112B at the each end 114A, 114B of pivot bar 110 for screws (not shown) to attach to tubing attachment brackets (not shown). There is one hole 116 in the center 118 for pivot point. There are two fanwise slots 120 near center hole 116 to limit the angle of recline.

As discuss above, there is a choice of desired height to attach brackets 18, 20 to wheelchair tubes 14, 16. For the backrest height selection, screws (not shown) are loosened, height adjusted, and screws are tightened by anyone without special skills or training. Also discussed above is the horizontal adjustment (fore-aft) whereby the pivot bar slots 112A, 112B are moveably connected to the J-shaped brackets. One embodiment of pivot bar slots 112A, 112B can be 1 inch length, which means the adjustment is one inch of horizontal adjustment.

In use for the present invention is in clinics as an evaluation tool for setting a comfortable position for other wheelchairs not equip with the angle adjustable backrest. It would be to determine suitable angle of the backrest during client evaluation in the seating clinic. At the seating clinics, as the clients are selecting the suitable chair, clinicians would have a tool that will allow them to decide on an appropriate angle for the backrest.

One of the advantages of the angle adjustable backrest is for periodic changes in angles to help with pressure relief while seated.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A backrest angle adjustable mechanism for attachment of a backrest to a wheelchair tubing comprising, a tubing attachment bracket being capable of attachment to the wheelchair tubing, wherein the tubing attachment bracket includes a center line along a common longitudinal axis;

a rod connected to the tubing attachment bracket, wherein the rod includes a through-bore of varying diameter to form a shoulder at a distal end;

a screw disposed in the through-bore of the rod; wherein a distal end of the screw extends out the distal end of the rod when assembled therein, wherein a proximal end of the screw includes a shoulder larger than a through-bore diameter at the distal end of the rod;

a biasing device entrapped between the shoulder of the screw and the shoulder of the rod, wherein the rod, the screw, and the biasing devise have an axial center line along the common longitudinal axis, wherein the screw is biased along the common longitudinal axis when the screw is further extended out of the distal end of the rod, a pivot bar pivotably connected to the tubing attachment bracket and attachable to the backrest, wherein the pivot bar rotates around the common longitudinal axis;

an inner gear having a center line along the common longitudinal axis, wherein the inner gear is attached to the pivot bar to form a pivotal assembly, wherein the inner gear includes one or more male gear teeth;

a cover having a center line along the common longitudinal axis; wherein the cover includes a plurality of internal female gear teeth that cooperate with the one or more male gear teeth of the inner gear to lock an angular position of the backrest;

wherein the cover is attached to the distal end of the screw for repeated longitudinal traverse cycles along the common longitudinal axis; and wherein, the backrest is free to rotate about the common longitudinal axis when the cover is longitudinally traversed away from the inner gear to disengage the one or more male teeth of the inner gear from the plurality of internal female gear teeth of the cover.

2. The backrest angle adjustable mechanism according to claim 1, further comprises an outer gear having an axial center line along the common longitudinal axis adjacent the inner gear, wherein the outer gear includes one or more male gear teeth; wherein the outer gear and the inner gear have the same outer diameter and male gear teeth dimensions.

3. The backrest angle adjustable mechanism according to claim 2, wherein rotational movement of the inner gear relative to the outer gear is prohibited when the plurality of internal female gear teeth of the cover are in contact with the plurality of male gear teeth of the inner gear and the plurality of male gear teeth of the outer gear.

4. The backrest angle adjustment mechanism according to claim 2, wherein the outer gear further comprises an angular position forward stop and an angular position backward stop to cooperation with a stop of the inner gear to limit the backrest to an angular rotation.

5. The backrest angle adjustable mechanism according to claim 1, wherein the outer gear is attached to the rod.

6. The backrest angle adjustable mechanism according to claim 5, wherein the tubing attachment bracket, the rod, and the outer gear form a static assembly.

7. The backrest angle adjustable mechanism according to claim 1, wherein the pivot bar attachment bracket and inner gear form a rotating assembly.

8. The backrest angle adjustment mechanism according to claim 1, wherein the biasing device is a spring.

9. The backrest angle adjustment mechanism according to claim 1, where a cable is attached to the cover to traverse the cover along the common longitudinal axis when the cable responds to a pulling motion in a direction away from the inner gear.

10. The backrest angle adjustment mechanism according to claim 9, further comprising a handle attached to the cable to actuate the pulling motion of the cable in a direction away from the inner gear.

11. The backrest angle adjustment mechanism according to claim 9, wherein the cable is attached to a second cover to simultaneously traverse each of the plurality of covers towards each other and along the common longitudinal axis with a single actuation motion.

12. The backrest angle adjustment mechanism according to claim 1, wherein the cover is an only cover.

13. A backrest angle adjustable mechanism for attachment of a backrest to a wheelchair tubing comprising, a tubing attachment bracket being capable of attachment to the wheelchair tubing, wherein the tubing attachment bracket includes a center line along a common longitudinal axis;

a pivot bar being capable of attachment to the backrest, wherein the pivot bar includes a center line along the common longitudinal axis; and a pivot bar locking mechanism releaseably connecting the tubing attachment bracket and the pivot bar thereto, wherein the pivot bar locking mechanism comprises:

a first gear with one or more male teeth attached to the pivot arm;

a cover with a plurality of female teeth meshable with the one or more male teeth of the first gear;

a second gear disposed between the cover and the first gear attached to the pivot arm, wherein the second gear includes one or more gear teeth; and a biasing device having a line of action along the common longitudinal axis to automatically advance the cover along the common longitudinal axis to engage the plurality of female teeth of the cover with the one or more gear teeth of the pivot arm gear and the second gear;

wherein the backrest angle adjustment mechanism is in a locked position when one or more male teeth of the first gear are meshed with plurality of female teeth of the cover, wherein the pivot bar is free to rotate about the common longitudinal axis when the pivot bar locking mechanism is in a pivot arm released position.

14. The backrest angle adjustment mechanism according to claim 13, wherein the biasing device induces an axial force onto the cover along the common longitudinal axis.

15. The backrest angle adjustment mechanism according to claim 13, wherein the biasing device is disposed between the cover and the tubing attachment bracket.

* * * * *